US012646711B2

(12) United States Patent
Ceder et al.

(10) Patent No.: US 12,646,711 B2
(45) Date of Patent: Jun. 2, 2026

(54) HIGH-ENERGY LI-RICH ROCKSALT CATHODES WITH INHIBITED CATION MIGRATION

(71) Applicant: THE REGENTS OF THE UNIVERSITY OF CALIFORNIA, Oakland, CA (US)

(72) Inventors: Gerbrand Ceder, Berkeley, CA (US); Jianping Huang, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 59 days.

(21) Appl. No.: 18/587,049

(22) Filed: Feb. 26, 2024

(65) Prior Publication Data

US 2024/0258515 A1     Aug. 1, 2024

Related U.S. Application Data

(63) Continuation of application No. PCT/US2022/076192, filed on Sep. 9, 2022.
(Continued)

(51) Int. Cl.
*H01M 4/505* (2010.01)
*C01G 31/00* (2006.01)
(Continued)

(52) U.S. Cl.
CPC .......... *H01M 4/505* (2013.01); *C01G 31/006* (2013.01); *C01G 45/1228* (2013.01);
(Continued)

(58) Field of Classification Search
None
See application file for complete search history.

(56) References Cited

U.S. PATENT DOCUMENTS 7,468,223 B2    12/2008  Thackeray
2003/0180616 A1    9/2003  Johnson
(Continued)

OTHER PUBLICATIONS

Kynar Flex 2801-00 Powder: Technical Data Sheet (Unknown Date) https://hpp.arkema.com/en/products/product/f/flup_hpp_Kynar/p/kynar-flex-2801-00-powder/.*
(Continued)

*Primary Examiner* — Khanh T Nguyen
(74) *Attorney, Agent, or Firm* — O'BANION & RITCHEY LLP; John P. O'Banion

(57) ABSTRACT

A lithium rich partially cation disordered transition metal oxide cathode material is provided that exhibits reduced voltage hysteresis, reduced or inhibited transition metal migration and increased capacity and energy storage compared with layered oxides. The lithium rich cathode material is based on $Li_{1+x}Cr_{1-x-y}M_yO_2$ where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$, and where $0<x<0.33$ and $0<y<0.67$. Cation disordering is induced in the material that alters both the structure and the electrochemistry and effectively mitigate voltage hysteresis and increase the reversibility of the $Cr^{3+}/Cr^{6+}$ redox couple and the energy capacity. Lithium transport in the cation-disordered structure occurs through a percolation network of Li-rich tetrahedral environments.

7 Claims, 10 Drawing Sheets

Related U.S. Application Data

(60) Provisional application No. 63/270,726, filed on Oct. 22, 2021, provisional application No. 63/242,301, filed on Sep. 9, 2021.

(51) Int. Cl.
 *C01G 45/1228* (2025.01)
 *H01M 4/62* (2006.01)

(52) U.S. Cl.
 CPC ........... *H01M 4/623* (2013.01); *H01M 4/625* (2013.01); *C01P 2002/20* (2013.01); *C01P 2002/50* (2013.01); *C01P 2002/72* (2013.01); *C01P 2002/77* (2013.01); *C01P 2006/40* (2013.01)

(56) References Cited

U.S. PATENT DOCUMENTS

2018/0053934 A1 2/2018 Ceder
2019/0088940 A1 3/2019 Ceder

OTHER PUBLICATIONS

Lee et al., "Unlocking the Potential of Cation-disordered Oxides for Rechargeable Lithium Batteries", Science, 343(31), Jan. 31, 2014, pp. 519-522.*

ISA/US, United States Patent and Trademark Office (USPTO), International Search Report and Written Opinion issued Mar. 3, 2023, related PCT international application No. PCT/US2022/076192, pp. 1-13, with claims searched, 14-21.

Goodenough, John B., "The Li-Ion Rechargeable Battery: A Perspective", Journal of the American Chemical Society, vol. 135, 2013, 99. 1167-1176, 2013.

Manthiram, Arumugam, "An Outlook on Lithium Ion Battery Technology", ACS Central Science, vol. 3, Sep. 7, 2017, pp. 1063-1069.

Thackery, Michael M. et al., "Li2MnO3-stabilized LiMO2 (M = Mn, Ni, Co) electrodes for lithium-ion batteries", Journal of Materials Chemistry, vol. 17, No. 30, 2007, pp. 3112-3125.

Nayak, Prasant Kumar, et al., "Review on Challenges and Recent Advances in the Electrochemical Performance of High Capacity Li- and Mn-Rich Cathode Materials for Li-Ion Batteries", Advanced Energy Materials, vol. 8, 2018, 1702397, pp. 1-16.

Gent, William, E. et al. "Coupling between oxygen redox and cation migration explains unusual electrochemistry in lithium-rich layered oxides", Nature Communications, vol. 8, Issue 209, 2017, pp. 1-12.

House, Robert, A., et al. "First-cycle voltage hysteresis in Li-rich 3d cathodes associated with molecular O2 trapped in the bulk", National Energy, vol. 5, 2020, pp. 1-18.

Hong, Jihyun, et al. "Metal-oxygen decoordination stabilizes anion redox in Lirich oxides", National Materials, vol. 18, 2019, pp. 256-265.

Seo, Dong-Hwa, et al., "The structural and chemical origin of the oxygen redox activity in layered and cation-disordered Li-access cathode materials", Nature Chemistry, vol. 8, Jul. 1, 2016, pp. 1-7.

Balasubramanian, M., "In Situ X-Ray Absorption Study of a Layered Manganese-Chromium Oxide-Based Cathode Material", Journal of the Electrochemical Society, vol. 149, Issue 2, 2002, pp. 1-10.

Lyu, Yingchum et al., "Probing Reversible Multielectron Transfer and Structure Evolution of Li1.2Cr0.4Mn0.4O2 Cathode Material for Li-Ion Batteries in a Voltage Range of 1.0-4.8 V", Chemical Materials, vol. 27, 2015, pp. 5238-5252.

Ammundsen, Brett, et al. "Local Structure and First Cycle Redox Mechanism of Layered Li1.2Cr0.4Mn0.4 O 2 Cathode Material", Journal of the Electrochemical Society, vol. 149, 2002, pp. A431-A436.

Lu, Zhonghua, et al. "In Situ and Ex Situ XRD Investigation of Li [ Crx Li1 / 3 − x / 3Mn2 / 3 − 2x / 3 ] O 2 (x = 1/3) Cathode Material", Journal of the Electrochemical Society, vol. 150, No. 8, 2003, pp. A1044-A1051.

Lu, Zhonghua, et al. "Structure and Electrochemistry of Layered Li[Cr[sub x]Li[sub (1/3−x/3)]Mn[sub (2/3−2x/3)]]O[sub 2]", Journal of Electrochemical Society, vol. 149, 2002, A1454, 7 pages.

Zhang, Lianqi, et al., "Li—Cr—Ti—O Cathode Materials Related to the LiCrO2—Li2TiO3 Solid Solution", Journal of Electrochemical Society, vol. 150, 2003, pp. A601-A607.

Mi, Xin et al., "Carbon-Coated Li1.2Cr0.4Ti0.4O2, Cathode Material for Lithium-Ion Batteries", Electrochemical Solid-State Letters, vol. 9, 2006, pp. A324-A327.

Zhang, Lianqi, et al., "Novel layered Li—Cr—Ti—O cathode materials for lithium rechargeable batteries", Electrochemical Communications, vol. 4, 2002, pp. 560-564.

Mi, Xin, et al., "Electrochemical and structural studies of the carbon-coated Li[CrxLi(1/3−x/3)Ti(2/3−2x/3)]O2 (x=0.3, 0.35, 0.4, 0.45)", Journal of Power Sources, vol. 174, 2007, pp. 867-871.

Eum, Donggun, et al. "Voltage decay and redox asymmetry mitigation by reversible cation migration in lithium-rich layered oxide electrodes", National Materials, vol. 19, 2020, pp. 419-427.

Lee, Jinhyuk, et al. "Unlocking the potential of cation-disordered oxides for rechargeable lithium batteries". Science, vol. 343, 2014, pp. 519-522.

Clément, R J., et al., "Cation-disordered rocksalt transition metal oxides and oxyfluorides for high energy lithium-ion cathodes", Energy Environmental Science, vol. 13, 2020, pp. 345-373.

Boldyrev, Vladimir, V. "Mechanochemistry and mechanical activation of solids", Russian Chemical Reviews, vol. 75, 2006, pp. 177-189.

Shi, Tan, et al. "Shear-Assisted Formation of Cation-Disordered Rocksalt NaMO2 (M = Fe or Mn)", Chemistry of Materials, vol. 30, 2018, pp. 8811-8821.

House, Robert, A. et al. "Lithium manganese oxyfluoride as a new cathode material exhibiting oxygen redox", Energy Environment Science, vol. 11, 2018, pp. 1-7.

Luo, Kun, et al. "Charge-compensation in 3d-transition-metal-oxide intercalation cathodes through the generation of localized electron holes on oxygen", Nature Chemistry, vol. 8, 2016, pp. 684-691.

Lee, Jinhyuk et al. "Reversible Mn2+/Mn4+ double redox in lithium-excess cathode materials", Nature vol. 556, 2018, pp. 185-190.

Takeda, Nanami, et al. "Reversible Li storage for nanosize cation/aniondisordered rocksalt-type oxyfluorides: LiMoO2—x LiF (0 ≤ x ≤ 2) binary system", Journal of Power Sources, vol. 367, 2017, pp. 122-129.

Takeda, Nanami, et al. "Improved Electrode Performance of Lithium-Excess Molybdenum oxyfluoride: Titanium Substitution with Concentrated Electrolyte", ACS Applied Energy Materials, vol. 2, 2019, pp. 1629-1633.

Suo, Liumin, et al. "Fluorine-donating electrolytes enable highly reversible 5-V-class Li metal batteries", Proc. Natl. Acad. Sci., vol. 115, 2018, pp. 1156-1161.

Wang, Jianhui et al. "Superconcentrated electrolytes for a high-voltage lithium-ion battery", Nature Communications, vol. 7, 2016, pp. 1-9.

Davenport, A. J. et al. "In Situ X-Ray Absorption Study of Chromium Valency Changes in Passive Oxides on Sputtered AlCr Thin Films under Electrochemical Control", Journal of the Electrochemical Society, vol. 138, 1991, pp. 337-338.

Manceau, Alain, et al., "L. X-ray absorption spectroscopic study of the sorption of Cr(III) at the oxide-water interface: I. Molecular mechanism of Cr(III) oxidation on Mn oxides", Journal of Colloid Interface Science, vol. 148, 1992, pp. 425-442.

Reed, J., et al., "Layered-to-Spinel Phase Transition in Li[sub x]MnO[sub 2]", Electrochemical Solid-State Letters, vol. 4, 2001, pp. A78.

Bréger, Julien, et al. "Effect of High Voltage on the Structure and Electrochemistry of LiNi0.5Mn0.5O2: A Joint Experimental and Theoretical Study", Chemical Materials, vol. 18, 2006, pp. 4768-4781.

(56) References Cited

OTHER PUBLICATIONS

Bo, Shou-Hang, et al., "Layered-to-Rock-Salt Transformation in Desodiated NaxCrO2 (x 0.4)", Chemical Materials, vol. 28, 2016, pp. 1419-1429.

Lee, Eungje,, et al., "Role of Cr3+/Cr6+ redox in chromium-substituted Li2MnO3. LiNi1/2Mn1/2O2 layered composite cathodes: electrochemistry and voltage fade", Journal of Materials Chemistry A, vol. 3, 2015, pp. 9915-9924.

Karan, N. K. et al. "Morphology, Structure, and Electrochemistry of Solution-Derived LiMn0.5 – x Cr2x Ni0.5 – x O2 for Lithium-Ion Cells", Journal of the Electrochemical Society, vol. 156, 2009, pp. A553-A562.

Ren, Shuhua, et al., "Improved Voltage and Cycling for Li+ Intercalation in High-Capacity Disordered Oxyfluoride Cathodes", Advanced Science, vol. 2, 2015, pp. 1-6.

Huang, Jianping, et al., "Non-topotactic reactions enable high rate capability in Li-rich cathode materials", National Energy, vol. 6, 2021, pp. 706-714.

Zheng, Xuerong, et al., "Reversible Mn/Cr dual redox in cation-disordered Liexcess cathode materials for stable lithium ion batteries", Science Direct, vol. 212, 2021, pp. 11693.

Hoshino, Satoshi, et al., "Reversible Three-Electron Redox Reaction of Mo3+/Mo6+ for Rechargeable Lithium Batteries", ACS Energy Letters, vol. 2, 2017, pp. 733-738.

Nakajima, Mizuki, et al. "Lithium-Excess Cation-Disordered Rocksalt-Type Oxide with Nanoscale Phase Segregation: Li1.25Nb0.25V0. 5O2", Chemistry of Materials, vol. 29, 2017, pp. 6927-6935.

Chen, Ruiyong, et al., "Disordered Lithium-Rich Oxyfluoride as a Stable Host for Enhanced Li+ Intercalation Storage", Advanced Energy Materials, vol. 5, 2015, pp. 1-7.

Yamada, Atsuo, et al., "Jahn-Teller instability in spinel Li—Mn—O", Journal of Power Sources, vols. 81-82, 1999, pp. 73-78.

Zuo, Changjian, et al., "Double the Capacity of Manganese Spinel for Lithium-Ion Storage by Suppression of Cooperative Jahn-Teller Distortion", Advanced Energy Materials, vol. 10, 2020, pp. 1-10.

Ravel, Bruce, "Hephaestus: data analysis for X-ray absorption spectroscopy using IFEFFIT", Journal of Synchrotron Radiation, vol. 12, 2005, pp. 537-541.

Ravel, Bruce, "Athena and Artemis Interactive Graphical Data Analysisusing IFEFFIT", Physica Scripta, vol. 1007 , 2005, pp.

Oishi, Masatsugu et al., "Charge compensation mechanisms in Li1.16Ni0.15Co0.19Mn0.50O2 positive electrode material for Li-ion batteries analyzed by a combination of hard and soft X-ray absorption near edge structure", Journal of Power Sources, vol. 222, 2013, pp. 45-51.

Croy, Jason R., et al., "First-Cycle Evolution of Local Structure in Electrochemically Activated Li2MnO3", Chemistry of Materials, vol. 26, 2014, pp. 7091-7098.

* cited by examiner

100

110 — Provide a Layered Lithium Rich Transition Metal Oxide

120 — Introduce Cation Disorder Into the Li-TM Oxide

130 — Confirming Partial Disordering

140 — Form a Cathode from Fully or Partially Disordered Li-TM Oxide Material

R-3m

Fm-3m

0TM

HIGH-ENERGY LI-RICH ROCKSALT CATHODES WITH INHIBITED CATION MIGRATION

CROSS-REFERENCE TO RELATED APPLICATIONS

This application claims priority to, and is a 35 U.S.C. § 111(a) continuation of, PCT international application number PCT/US2022/076192 filed on Sep. 9, 2022, incorporated herein by reference in its entirety, which claims priority to, and the benefit of, U.S. provisional patent application Ser. No. 63/270,726 filed on Oct. 22, 2021, incorporated herein by reference in its entirety, and which also claims priority to, and the benefit of, U.S. provisional patent application Ser. No. 63/242,301 filed on Sep. 9, 2021, incorporated herein by reference in its entirety.

The above-referenced PCT international application was published as PCT International Publication No. WO 2023/039517 A1 on Mar. 16, 2023, and republished as PCT International Publication No. WO 2023/039517 A2 on Apr. 20, 2023, each of which is incorporated herein by reference in its entirety.

STATEMENT REGARDING FEDERALLY SPONSORED RESEARCH OR DEVELOPMENT

This invention was made with government support under Contract No. DE-AC02-05CH11231 awarded by the U.S. Department of Energy. The government has certain rights in the invention.

BACKGROUND

1. Technical Field

This technology pertains generally to energy storage compositions, devices and methods and more particularly for partially cation disordered cathode material compositions and methods. The compositions exhibit a substantial reduction in voltage hysteresis and an increase in capacity and energy density over the natural fully ordered lithium rich transition metal oxide electrode materials. The introduction of partial cation disorder changes both the structure and the redox pathways as well as a reduction in collective transition metal migration into the Li layers compared to the fully ordered compositions.

2. Background

Rechargeable lithium-ion batteries with high energy density and low cost are needed to meet the rapidly increasing demands for long-range electric vehicles and consumer electronics. Li-rich cathodes are promising energy storage materials due to their high energy densities. However, voltage hysteresis, which is generally associated with transition metal (TM) migration, limits their energy efficiency as well as their implementation in practical devices.

A combination of high cyclable Li content with good Li diffusion kinetics, high electron redox capacity, and high stability even under large changes of Li content and metal valence are needed to produce cathodes with high capacities. These requirements are often in conflict with each other as exemplified by Li-rich oxides, a promising category of high-capacity cathodes.

Because of their high Li content, Li-rich oxides have less transition metal capacity and contain less well hybridized oxygen leading to more a greater reliance on oxygen redox to improve energy density. These material characteristics, however, tend to produce decreased stability which leads to more pronounced hysteresis. For example, layered Li-rich transition metal oxides (i.e., $Li_{1+x}Ni_yCo_xMn_{1-x-y-z}O_2$) have large capacities (>250 mAh g$^{-1}$) but show voltage hysteresis and continuous voltage fade. Recently proposed mechanisms for the hysteresis involve oxygen oxidation, transition metal (TM) migration and oxidation of $O^{2-}$ to molecular $O_2$ which is then trapped in the bulk.

In principle, Li-rich materials that use ions with multiple redox couples (e.g., $Cr^{3+}/Cr^{6+}$, $V^{3+}/V^{5+}$, and $Mo^{3+}/Mo^{6+}$) can remove the trade-off between Li-excess and transition metal capacity, and thereby reduce oxygen redox. Past efforts to find high-energy cathodes have focused on systems with very high theoretical capacity (>300 mAh g$^{-1}$) such as $xLi_2MnO_3 \cdot (1-x)LiCrO_2$ and $xLi_2TiO_3 \cdot (1-x)LiCrO_2$. However, in practice the $Li_{1.22}Cr_{0.33}Mn_{0.45}O_2$ material only delivers a reversible capacity of about 130 mAh g$^{-1}$ with a large irreversible capacity (~90 mAh g$^{-1}$) between 2.0 and 4.35 V, which is attributed to the irreversible Cr migration from the TM layer to the Li layer. A low discharge voltage limit (1.5 or 1.0 V) has to be used to recover the irreversible capacity in the Cr-based system where over 1 V voltage hysteresis is observed.

These past examples generally illustrate two alternative challenges in cathode design. Either one uses immobile ions in ordered cathodes, which limits the redox active elements in the layered structure to Ni and Co (i.e. the NMC class), or one uses ions that can migrate during electrochemical cycling and deal with the hysteresis and/or capacity/voltage fade due to structural changes within the composition. Accordingly, there is a need for the development of new Li-rich cathode active materials that are not hindered by voltage hysteresis and continuous voltage fade and simple methods of production.

BRIEF SUMMARY

Lithium rich electrode materials are provided that exhibit reduced voltage hysteresis, reduced or inhibited transition metal migration and increased capacity and energy density resulting from the introduction of cation disordering in the material during electrochemical cycling. The lithium rich cathode materials generally comprise $Li_{1+x}Cr_{1-x-y}M_yO_2$, where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$, and where $0<x<0.33$ and $0<y<0.67$.

The cathode material is illustrated by introducing cation disorder in the layered Li-rich $Li_{1.2}Cr_{0.4}Mn_{0.4}O_2$ material that is shown to effectively mitigate voltage hysteresis and increase the reversibility of the $Cr^{3+}/Cr^{6+}$ redox couple. The $Li_{1.2}Cr_{0.4}Mn_{0.4}O_2$ with partial cation disorder, for example, shows a large reversible capacity of >200 mAh g$^{-1}$ for 100 cycles at 100 mA g$^{-1}$ due to the inhibited collective Cr migration.

The use of Li-rich transition metal oxides for reversible, high-capacity cathode energy storage materials is severely limited by the occurrence of voltage hysteresis and continuous voltage fade during electrochemical cycling. Voltage hysteresis is generally associated with transition metal (TM) migration into the Li layer. For example, the substantial voltage hysteresis (>2.5 V) observed in a layered lithium-rich chromium manganese oxide is associated with collective TM migration into the Li layers, which leads to an increased interlayer Coulomb interactions and a release of internal energy in the form of heat.

One general strategy to mitigate the hysteretic effect induced by transition metal migration is to provide structures that minimize the opportunity for cation disorder during electrochemical cycling. For example, an $O_2$-type $Li_x(Li_{0.2}Ni_{0.2}Mn_{0.6})O_2$ ($x \approx 0.83$) material has been shown to limit cation disorder by restricting TM migration to the Li layer. In this structure, occupation of a TM in a Li site is destabilized by the strong electrostatic repulsion it experiences there from the TM layer. Reductions of irreversible TM migration as well as voltage hysteresis were obtained with such material structural engineering. However, such reductions were limited.

The present technology provides an alternative strategy which allows for TM migration but creates enough disorder in the material so that the TM migration cannot occur collectively, thereby minimizing hysteresis. Instead of inhibiting cation order-disorder transition during electrochemical cycling, the introduction of cation disorder in a layered Li-rich rock salt cathode, $Li_{1.2}Cr_{0.4}Mn_{0.4}O_2$, for example, can effectively mitigate voltage hysteresis and increase reversibility of the $Cr^{3+}/Cr^{6+}$ redox in this illustration. Li transport in the cation disordered structure occurs through a percolation network of Li-rich tetrahedral environments (0-TM channels, where the tetrahedral site does not face-share with any TM) although there is no defined Li diffusion layer as in the conventional layered structure of this material.

The introduction of cation disordering can be an effective strategy to inhibit such collective TM migration, thereby significantly mitigating the voltage hysteresis by two-fold and enabling the achievement of high capacity (>360 mAh $g^{-1}$) and energy density (>1100 Wh $kg^{-1}$).

Cation disorder is preferably introduced into layered $Li_{1.2}Cr_{0.4}Mn_{0.4}O_2$ (L-LCMO) through shear stress induced by mechanical milling. The milled material exhibits partial cation mixing and is denoted as partially disordered $Li_{1.2}Cr_{0.4}Mn_{0.4}O_2$ (PD-LCMO). PD-LCMO exhibits significantly decreased voltage hysteresis relative to L-LCMO and delivers a reversible capacity of >200 mAh $g^{-1}$ for 100 cycles at a current density of 100 mA $g^{-1}$.

The redox mechanisms of layered and partially disordered LCMO were evaluated using X-ray diffraction (XRD) and X-ray absorption spectroscopy (XAS) and demonstrate that at the top of charge (TOC) collective Cr migration to Li layer in L-LCMO causes hysteretic Cr migration and voltage hysteresis, which are associated with structural stabilization.

In contrast, cation disorder in the PD-LCMO material was shown to inhibit the collective Cr migration and reduces the structural stabilization effect, contributing to the improved electrochemistry. Accordingly, the introduction of cation disordering can be an effective strategy to inhibit such collective TM migration, thereby significantly mitigating the voltage hysteresis by two-fold and enabling the achievement of high capacity, defined as (>360 mAh $g^{-1}$), and energy density, defined as (>1100 Wh $kg^{-1}$).

The cation-disordered rock salt cathodes of the present technology can accommodate a high level of TM migration, which enables the selection of redox couples involving mobile cations. The successful manipulation of reversible multi-electron redox and TM migration through cation disordering provides opportunities to realize high-performance cathode materials for lithium-ion batteries.

As used herein, the term "fully ordered" lithium transition metal oxide material comprises $Li_{1+x}Cr_{1-x-y}M_yO_2$ where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$, and where $0<x<0.33$ and $0<y<0.67$ in its naturally occurring layered form. In addition, the fully ordered lithium transition metal oxide material may also comprise layered $Li_{1+x}V_{1-x-y}M_yO_2$ and/or $Li_{1+x}Mo_{1-x-y}M_yO_2$ where M is a transition metal with limited redox activity, such as $Ti^{4+}$, $Zr^{4+}$, $Sn^{4+}$, $Nb^{5+}$, $Ta^{5+}$, and $W^{6+}$, and where $0<x<0.33$ and $0<y<0.67$ in its naturally occurring layered form.

As used herein, the term "partially disordered" or "partially cation-disordered" lithium transition metal oxide material is defined as a disruption of the naturally occurring layered structure of $Li_{1+x}Cr_{1-x-y}M_yO_2$ where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$, and where $0<x<0.33$ and $0<y<0.67$ or $Li_{1+x}V_{1-x-y}M_yO_2$ and/or $Li_{1+x}Mo_{1-x-y}M_yO_2$ where M is a transition metal with limited redox activity, such as $Ti^{4+}$, $Zr^{4+}$, $Sn^{4+}$, $Nb^{5+}$, $Ta^{5+}$, and $W^{6+}$, and where $0<x<0.33$ and $0<y<0.67$.

The partial disorder created in the order of the Li-TM layered form may generally range from more than about 1% to less than about 99%. However, the preferred range of imposed cation disorder within the range of about 10% to about 35% cation disorder, e.g., about 10%, 15%, 20%, 25%, 30% or about 35% cation disorder. In another embodiment, the material has at least about 50%, e.g., about 50%, 55%, 60%, 65%, 70%, 75%, 80%, 85%, 90%, 95%, 96%, 97%, 98% or 99% cation disorder. The percentage of disorder can be controlled by milling time and conditions and can be optimized to produce desired performance characteristics.

According to one aspect of the technology, a method for reducing or inhibiting transition metal migration, reducing voltage hysteresis and increasing the capacity and energy density of layered $Li_{1+x}Cr_{1-x-y}M_yO_2$ where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$, and where $0<x<0.33$ and $0<y<0.67$ is provided.

According to another aspect of the technology, a method is provided for mitigating voltage hysteresis and increasing reversibility of $Cr^{3+}/Cr^{6+}$ $V^{3+}/V^{6+}$ or $Mo^{3+}/Mo^{6+}$ redox by introducing cation disorder in a layered Li-rich rock salt cathode.

Another aspect of the technology is to provide a method for introducing cation disorder in a layered Li-rich rock salt cathode material instead of inhibiting cation order-disorder transition during electrochemical cycling.

A further aspect of the technology is to provide a cathode active material of partially cation disordered $Li_{1+x}V_{1-x-y}M_yO_2$ or $Li_{1+x}Mo_{1-x-y}M_yO_2$ or $Li_{1+x}Cr_{1-x-y}M_yO_2$ where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$, and where $0<x<0.33$ and $0<y<0.67$ wherein lithium transport in the cation-disordered structure occurs through a percolation network of Li-rich tetrahedral environments.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, cathode compositions and methods for lithium rich transition metal oxide materials with cation disordering that inhibits collective transition metal migration into Li layers significantly mitigating the voltage hysteresis and greatly improving capacity and energy density over existing materials are generally shown. Several embodiments of the technology are described generally in FIG. 1 through FIG. 12 to illustrate the characteristics and functionality of the devices, compositions and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
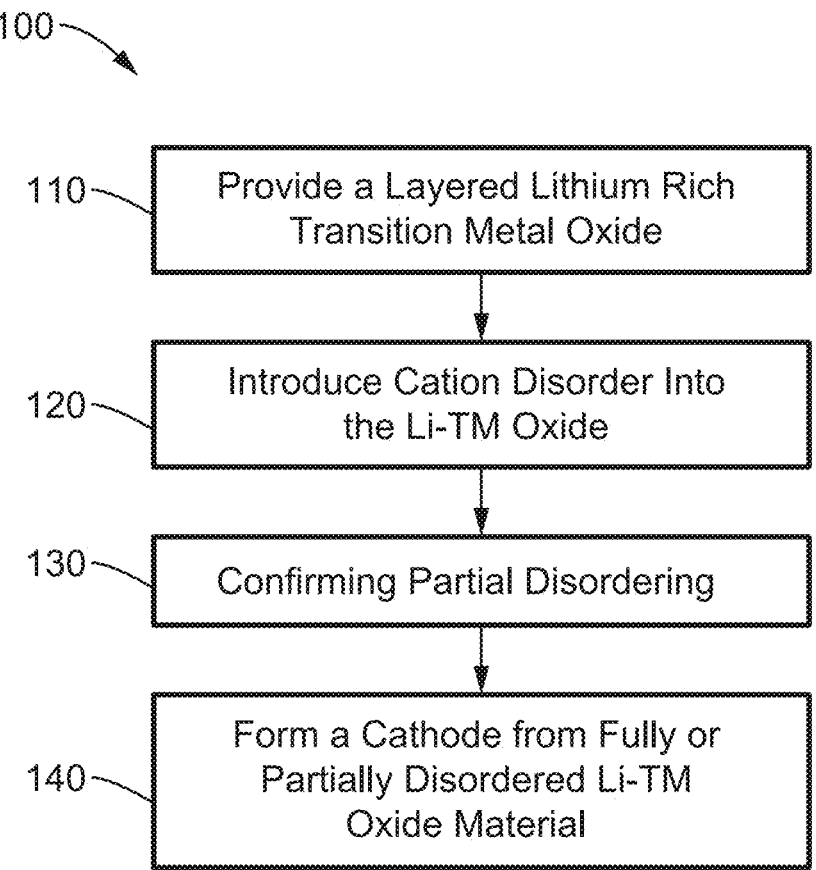
FIG. 1 is a functional block diagram of a method for producing partially disordered lithium rich transition metal oxide cathode materials according to one embodiment of the technology.

Referring now to FIG. 1, an embodiment of the method 100 for producing partially disordered Li-rich transition metal oxide electrodes is shown schematically. At block 110, a lithium rich transition metal oxide material is provided of the formula: $Li_{1+x}Cr_{1-x-y}M_yO_2$ where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$ and where 0<x<0.33 and 0<y<0.67. This group of lithium rich salts have a fully ordered structure in the form of alternating layers of lithium and transition metals like that shown in FIG. 2. However, these materials exhibit a substantial voltage hysteresis (>2.5V) that is associated with collective transition metal migration into the Li layers which leads to an increased interlayer Coulomb interaction and a release of internal energy. These negative features limit the energy efficiency and implementation into practical devices.

In another embodiment, the lithium rich transition metal oxide material that is provided at block 110 is of the formula $Li_{1+x}V_{1-x-y}M_yO_2$ and/or $Li_{1+x}Mo_{1-x-y}M_yO_2$ where M is a transition metal with limited redox activity, such as $Ti^{4+}$, $Zr^{4+}$, $Sn^{4+}$, $Nb^{5+}$, $Ta^{5+}$, and $W^{6+}$, and where 0<x<0.33 and 0<y<0.67. For simplicity, the $Li_{1+x}Cr_{1-x-y}M_yO_2$ lithium transition metal oxide material is used to illustrate the methods. However, the methods apply equally to the vanadium and molybdenum layered materials to produce comparable results.

Cation disordering is introduced into the selected layered lithium transition metal oxide material at block 120 to produce a partially or fully disordered material. The introduction of cation disorder at block 120 creates structural changes and changes the redox mechanism in the material selected at block 120 resulting in the inhibition or reduction of transition metal atom migration, mitigation of observed voltage hysteresis and an increase in voltage capacity as compared to the original layered material. Cation disorder is preferably introduced into layered Li rich transition metal oxide salt, such as $Li_{1.2}Cr_{0.4}Mn_{0.4}O_2$ (L-LCMO), through shear stress induced by mechanical milling at block 120. Control over the mechanical milling conditions such as milling time, grinding media, rotation speeds etc. will allow control over the degree or percentage of partial disorder introduced into the starting lithium transition metal oxide salt material at block 120.

Figure 3:
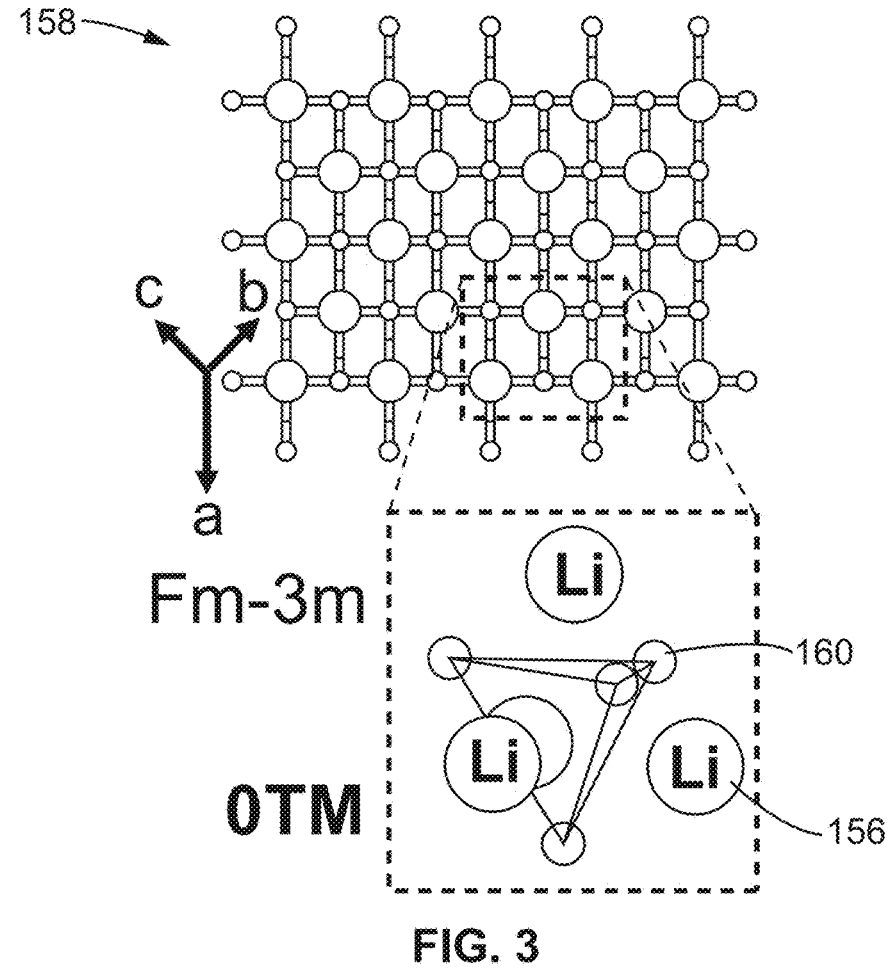
FIG. 3 is a schematic representation of the crystalline structure of a fully disordered $Li_{1.2}Cr_{0.4}Mn_{0.4}O_2$ material according to one embodiment of the technology. The inset in shows a tetrahedral site face-shared by four lithium atoms and zero transition-metal atoms (0TM site).

Fully disordered material like that shown in FIG. 3 will typically be produced after a characteristic milling time period. Although less preferred, fully disordered LCMO and other oxide salts also demonstrate significantly reduced voltage hysteresis and superior rate capability compared with the starting material. This confirms that the different electrochemistry between the original and processed materials primarily originate from their different structures (layered vs. disordered).

The partial disorder introduced into the fully ordered starting materials at block 120 changes both the TM/Li layering structure and the redox and collective TM migration mechanisms. Using L-LCMO and PD-LCMO as examples, in the Cr redox in layered L-LCMO the $Cr^{3+}$ is initially oxidized to $Cr^{4+}$ and then to $Cr^{6+}$ upon charging. At the top of charge, Cr atoms collectively migrate to the tetrahedral site in the Li layers, and the $Cr_{tet}$ induce the formation of $Cr_{tet}$—$Li_{tet}$ dumbbells which stabilize the layered structure. The lowered energy is lost in the form of heat causing voltage hysteresis. In the L-LCMO the redox pathway ($Cr^{6+}{\rightarrow}Cr^{3+}$) in lithiation does not retrace the de-lithiation oxidation sequence ($Cr^{3+}{\rightarrow}Cr^{4+}{\rightarrow}Cr^{6+}$). In the discharge process, the $Cr^{6+}$ is gradually reduced to $Cr^{3+}$ showing irreversible Cr migration upon charging and discharging.

Partial disorder introduced at block 120 produces a reversible $Cr^{3+}/Cr^{6+}$ three-electron redox and non-hysteretic Cr migration upon charge and discharge. The L-LCMO and PD-LCMO also show different Cr migration behavior in the charge process. Because the dumbbells are more randomly oriented in the partially disordered material structure, the collective effect of TM migration is limited making the voltage non-hysteretic. Therefore, the partially disordered material produced at block 120 shows significantly improved electrochemistry with high energy density and good cycling stability relative to the layered original Li transition metal oxide material.

Optionally, at block 130 of FIG. 1, the disorder introduced to the starting material at block 120 can be quantified with a comparison of X-ray diffraction (XRD) patterns for layered and milled materials. For example, it has been shown that ball milling will cause the relative intensity of the layer-related (003) diffraction peak to decrease, indicating a more disordered structure. As defined herein, a measure for partial disorder is a decrease in the relative intensity of the observed (003) diffraction peak of the starting material.

Direct evidence of disordering may also be confirmed at block 130 by aberration-corrected high-angle-annular-dark-field scanning transmission electron microscopy (HAADF-STEM). Other methods or devices for evaluating cation disorder known in the art may also be used at block 130.

The partially disordered lithium rich transition metal oxide material is a high-performance active cathode material for lithium-ion batteries. The partially disordered cathode material can be joined or mixed with conventional binders, conductive fillers or structural materials to form a conventional electrode structures or films at block 140. It can be seen that the partially disordered active material that is produced can be easily adapted to use in existing electrochemical cell designs and compatible electrolytes at block 140.

In one preferred embodiment, the partially disordered active material is mixed with at least one carbon derivative and at least one binder to form a composite mixture. Preferred carbon derivatives include carbon black, a plurality of carbon fibers, or carbon black and a plurality of carbon fibers. Preferred binders include polytetrafluoroethylene (PTFE), polyacrylic acid (PAA) and polyvinylidene fluoride (PVDF). It can be seen that the partially cation disordered active material can be adapted for use in many different compositions, structures and devices at block 140.

The Lithium rich electrode that is produced by the method 100 using any of the three layered lithium transition metal oxide materials at block 120 will exhibit reduced voltage hysteresis resulting from introduction of cation disordering during electrochemical cycling. The lithium transport in the cation-disordered structure occurs through a percolation network of Li-rich tetrahedral environments. The electrode will also exhibit increased reversibility of $Cr^{3+}/Cr^{6+}$, $V^{3+}/V^{6+}$ or $Mo^{3+}/Mo^{6+}$ redox and increased energy capacity compared with the original layered oxide materials.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality of the compositions and methods, fully ordered, fully disordered, and partially disordered samples of $Li_{1.2}Cr_{0.4}Mn_{0.4}O_2$ were prepared, characterized and compared. Crystal structures of the fully ordered or layered (L-LCMO) is shown schematically in FIG. 2 and disordered $Li_{1.2}Cr_{0.4}Mn_{0.4}O_2$ is shown schematically in FIG. 3 for comparison. The inset in FIG. 3 shows a tetrahedral site face-shared by four lithium atoms and zero transition-metal atoms (0TM site).

Figure 2:
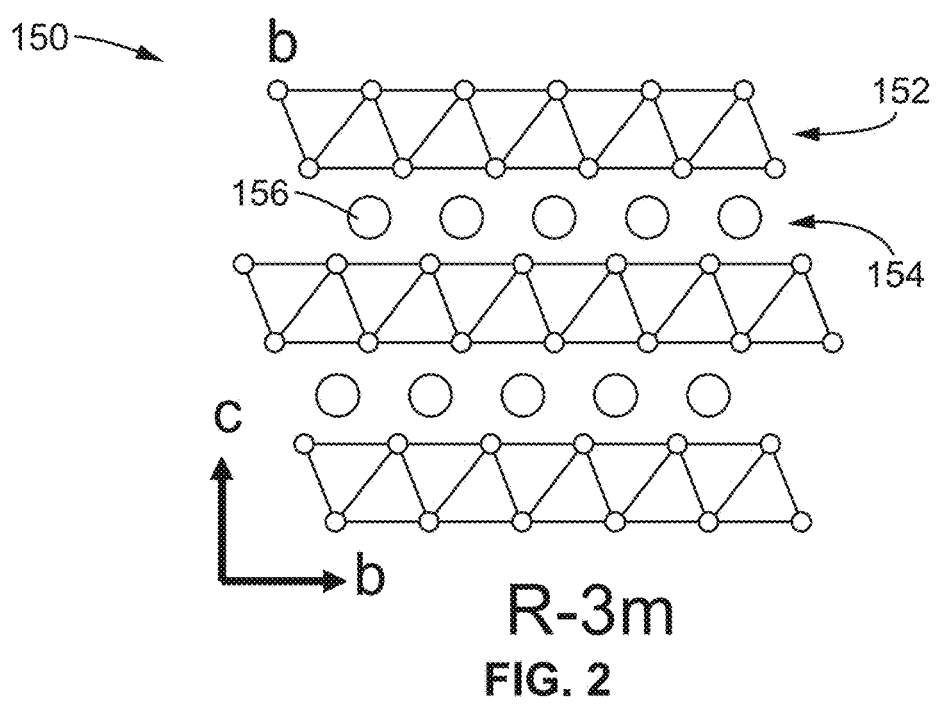
FIG. 2 is a schematic representation of the crystalline structure of a layered $Li_{1.2}Cr_{0.4}Mn_{0.4}O_2$ (L-LCMO) according to one embodiment of the technology. This is an illustration of one layered starting composition for the method of FIG. 1.

The layered L-LCMO structure 150 shown in FIG. 2 generally has fully ordered alternating layers of a transition metal layer 152 made up of Cr, Mn and O atoms and a lithium layer 154 made up of lithium atoms 156.

In contrast, the disordered structure 158 shown in FIG. 3 is not a layered structure. The detail set off by dashed lines in FIG. 3 shows a tetrahedral site face-shared by four lithium atoms 156, four oxygen atoms 160 and zero transition-metal atoms (0TM site).

Figure 4:
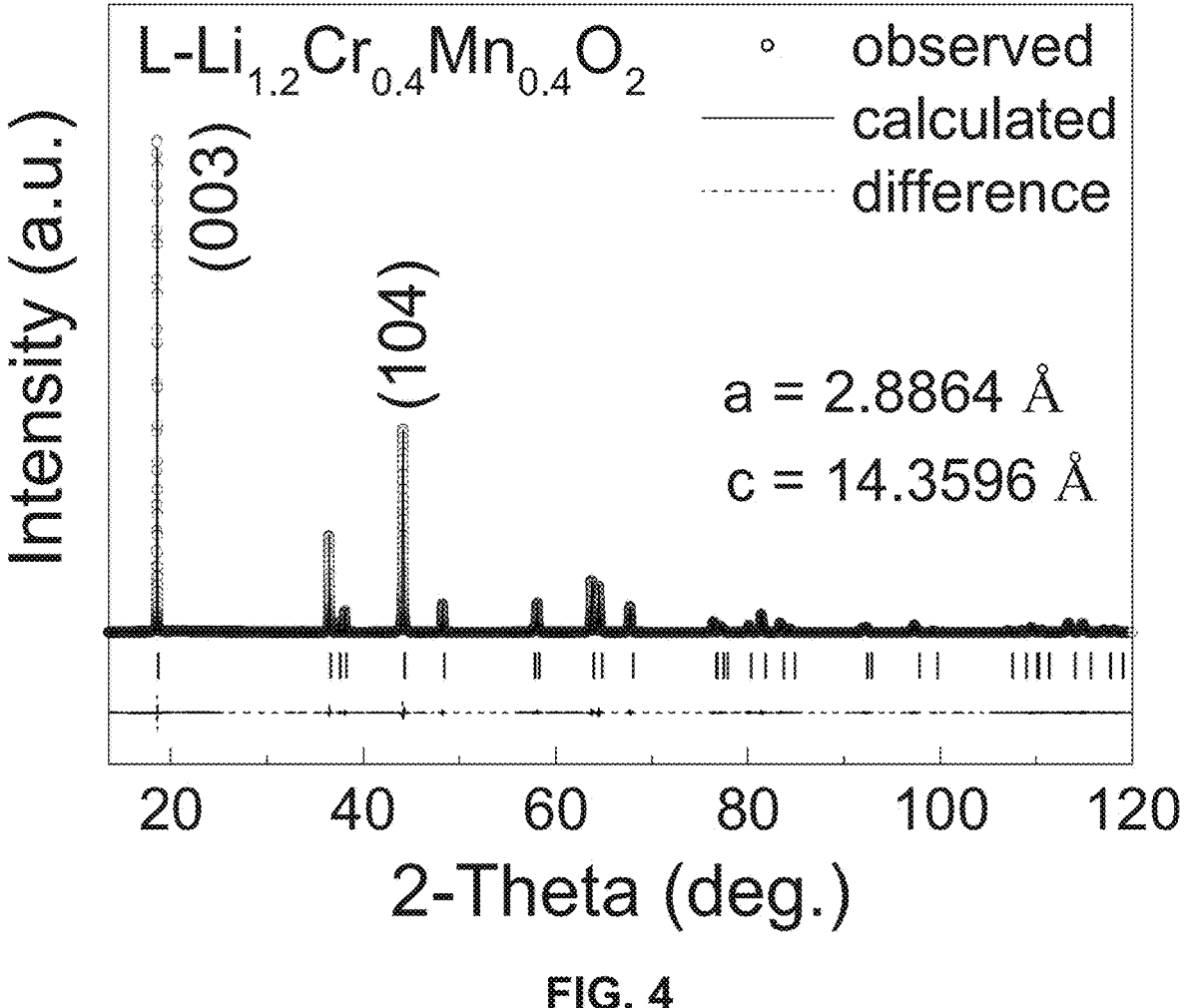
FIG. 4 is a plot of XRD patterns and refinement results for layered $Li_{1.2}Cr_{0.4}Mn_{0.4}O_2$ (L-LCMO).

Layered $Li_{1.2}Cr_{0.4}Mn_{0.4}O_2$ (L-LCMO) 150 was synthesized through a solid-state method. $Li_2CO_3$, $Cr_2O_3$, and $MnO_2$ were used as precursors, and 5% excess $Li_2CO_3$ was used to compensate for Li loss during synthesis. The ball-milled mixture was pelletized and then heated at 950° C. for 10 h under an argon atmosphere. The L-LCMO was synthesized in a structure that could be indexed to the R-3m space group using synchrotron XRD as shown in FIG. 2 and FIG. 4. No diffraction peak is observed in the 2-theta region of 20°-30°, indicating the absence of $Li_2MnO_3$-like domains. The refined lattice parameters a and c are 2.8864 and 14.3596 Å, respectively, similar to previously reported values. The da ratio, which can be used as a measure of "layeredness," of L-LCMO was 4.97, which is close to that of $LiCoO_2$ (4.99).

Figure 5:
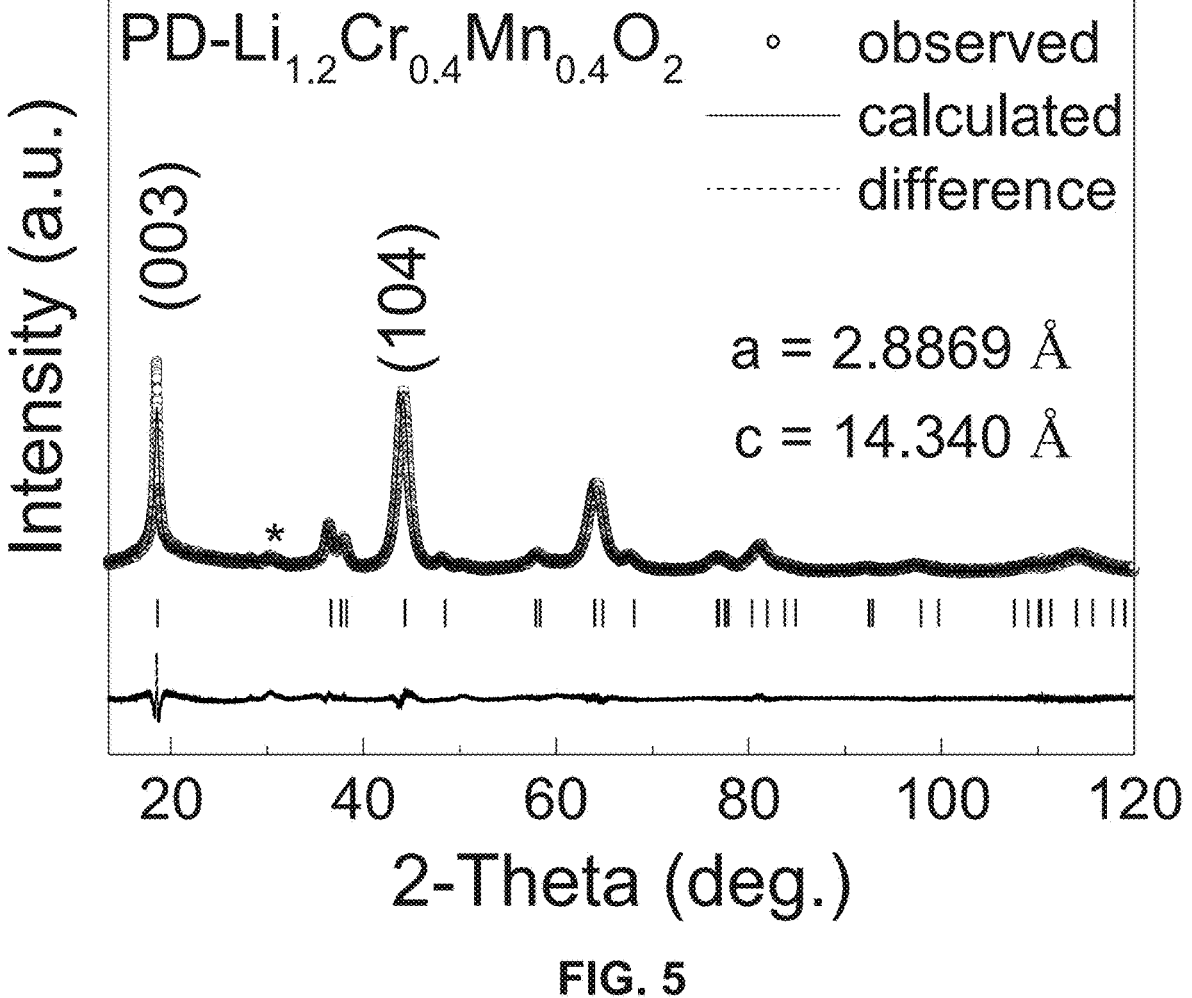
FIG. 5 is a plot of XRD patterns and refinement results for partially disordered $Li_{1.2}Cr_{0.4}Mn_{0.4}O_2$ (PD-LCMO).

Cation disorder was introduced into layered $Li_{1.2}Cr_{0.4}Mn_{0.4}O_2$ (L-LCMO) through shear stress induced by mechanical milling; this sample exhibits partial cation mixing and is denoted as partially disordered $Li_{1.2}Cr_{0.4}Mn_{0.4}O_2$ (PD-LCMO). Partially disordered $Li_{1.2}Cr_{0.4}Mn_{0.4}O_2$ (PD-LCMO) was prepared by ball-milling (SPEX 8000M Mix) the layered $Li_{1.2}Cr_{0.4}Mn_{0.4}O_2$. The L-LCMO powder (0.5 g) was added to an argon-filled 45-mL zirconia jar, and 10 g of yttria-stabilized zirconia balls (5 mm) were used as the grinding media. To obtain PD-LCMO, the L-LCMO was ball milled for 1 h using a SPEX 8000M Mixer. The ball milling caused the relative intensity of the (003) diffraction peak to decrease, suggesting a more disordered structure as shown in FIG. 5.

Disordered $Li_{1.2}Cr_{0.4}Mn_{0.4}O_2$ (D-LCMO) was prepared by ball-milling for a longer milling time (20 h). 1.0 g of L-LCMO was added into an argon-filled 50-mL stainless-steel grinding jar, and five 10-mm-diameter and ten 5-mm-diameter stainless-steel balls were used as grinding media. To obtain D-LCMO, the L-LCMO was ball-milled for 20 h using a Retsch PM 200 at 450 rpm.

X-ray diffraction (XRD) patterns of the as-prepared LCMO materials were collected at 11-BM at the Advanced Photon Source, Argonne National Laboratory. Time-of-flight (TOF) neutron diffraction experiments were performed at the Spallation Neutron Source at Oak Ridge National Laboratory on the Nanoscale Ordered Materials Diffractometer. Rietveld refinement of XRD and neutron diffraction was performed using the TOPAS software (version 6, Bruker AXS). The XRD patterns of the as-prepared LVTO materials were collected at the Stanford Synchrotron Radiation Lightsource. To compare the XRD data collected from different sources, the XRD patterns were converted to the ones based on Cu K-alpha (1.54 Å).

Scanning electron microscopy (SEM) images were captured using a Zeiss Gemini Ultra-55 analytical field-emission scanning electron microscope under acceleration voltages of 5-10 kV. High-resolution scanning transmission electron microscopy (STEM) images were obtained using the TEAM I microscope (a modified FEI Titan 80-300 microscope with double-aberration-corrected scanning transmission electron microscope) at the Molecular Foundry at Lawrence Berkeley National Laboratory using an acceleration voltage of 300 kV. Transmission electron microscopy (TEM) characterization was performed using a JEM-2100F at 200 kV.

Results of joint XRD and neutron diffraction refinement indicate ~18% cation mixing in PD-LCMO (See Table 1). The lattice parameters in Table 1 were refined for L-LCMO with fixed atomic positions and occupancies. The lattice parameters and atomic occupancies were refined for PD-LCMO with fixed atomic positions.

Direct evidence of disordering was further confirmed by aberration-corrected high-angle-annular-dark-field scanning transmission electron microscopy (HAADF-STEM). The Z-contrast high-resolution STEM images that showed stacking of Li and TM layers in L-LCMO, consistent with the XRD results.

A decreased Z-contrast difference between the Li and TM layers was also observed in PD-LCMO indicating the presence of TM cations in the Li layer. The HAADF-STEM images of PD-LCMO indicate that some Li layers exhibit a high degree of cation mixing while others exhibit a lower degree of cation mixing. The fast Fourier transform pattern confirms the R-3m space group in PD-LCMO. These findings illustrate that the cation arrangement was partially disordered in PD-LCMO.

Example 2

To evaluate the electrochemistry of L-LCMO and PD-LCMO materials, cathode films and coin cells were assembled and voltage profiles and capacity retention of L-LCMO and PD-LCMO were evaluated.

The cathode films of L-LCMO or PD-LCM active material, carbon black (Timcal, SUPER C65), and polytetrafluoroethylene (PTFE, DuPont, Teflon 8A) were prepared by mixing in a weight ratio of 70:20:10. The mixture was then rolled into a thin film inside an argon-filled glove box. 1 M $LiPF_6$ in 1:1 (volume ratio) ethylene carbonate (EC) and dimethyl carbonate (DMC) (BASF) was used as the electrolyte. The concentrated electrolyte, lithium bis(fluorosulfonyl)amide (LiFSI):DMC in a molar ratio of 1:1.1, was prepared by dissolving the LFSI salt into the DMC solution in an argon-filled glovebox.

Coin cells were assembled using the prepared cathode film, lithium metal foil, electrolyte, and separators (Whatman glass microfiber filter) in an argon-filled glove box. The loading density of active material was approximately 3 mg $cm^{-2}$ for each cathode film. Galvanostatic cycling tests were performed at room temperature using an Arbin battery tester. Galvanostatic intermittent titration technique (GITT) measurements were performed by charging/discharging the cell for 10 min at a current density of 50 mA $g^{-1}$ and relaxing for 5 h to reach a quasi-equilibrium state.

Electrochemically de-lithiated/lithiated samples were prepared by charging/discharging the cells at a current density of 20 mA $g^{-1}$, and the charged/discharged cathode films were collected after washing with DMC in an argon-filled glove box. Cathode films consisting of 70% PD-LCMO, 20% carbon black, and 10% polyvinylidene fluoride were used for synchrotron-based ex-situ XRD measurements.

Figure 6:
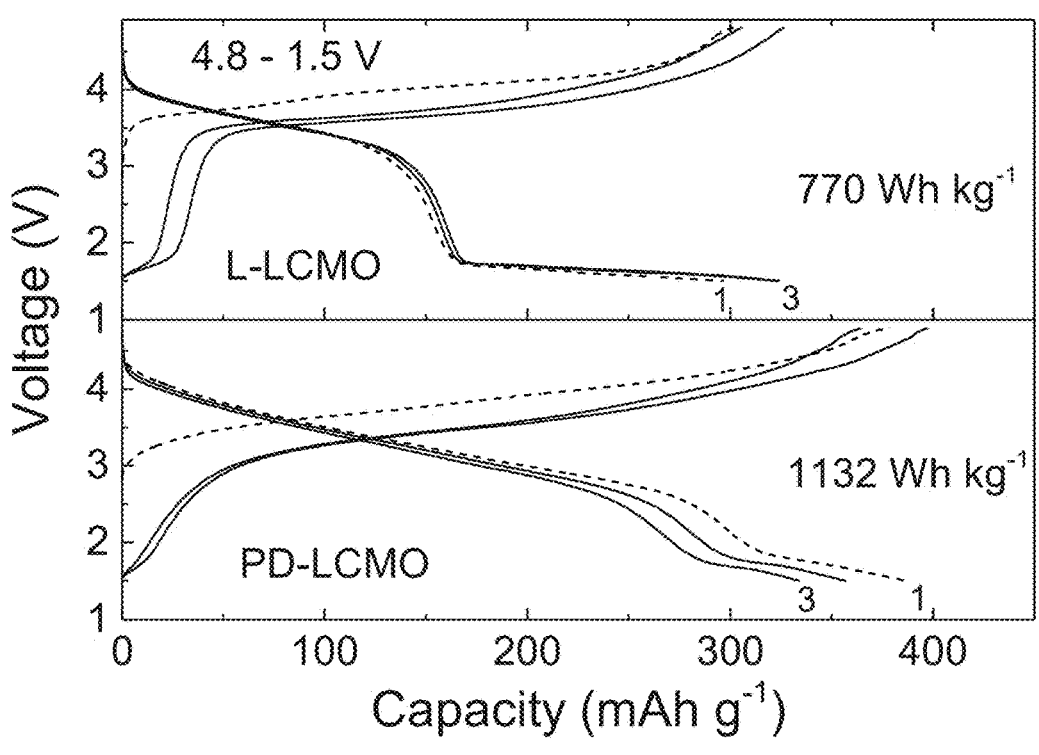
FIG. 6 is a plot of first-cycle voltage profiles of L-LCMO and PD-LCMO at 20 mA $g^{-1}$ in the voltage window of 4.8-1.5 V.

The voltage profiles of L-LCMO and PD-LCMO at 20 mA/g in the voltage window of 4.8-1.5 V from cycle 1 to cycle 3 are compared in FIG. 6. It was observed that L-LCMO delivered a discharge capacity of 297 mAh $g^{-1}$ with two distinct voltage plateaus at approximately 3.6 and 1.6 V. Because 48% the discharge capacity is delivered in the low-voltage (1.6 V) plateau, L-LCMO only had a discharge energy density of 770 Wh $kg^{-1}$ with an average voltage of 2.6 V. The L-LCMO maintains the low discharge voltage plateau upon electrochemical cycling. PD-LCMO delivers an initial discharge capacity of 387 mAh $g^{-1}$ (1.2 $Li^+$). Notably, 79% of the discharge capacity is delivered above 2 V for PD-LCMO, leading to a high discharge energy density of 1132 Wh $kg^{-1}$.

Figure 7:
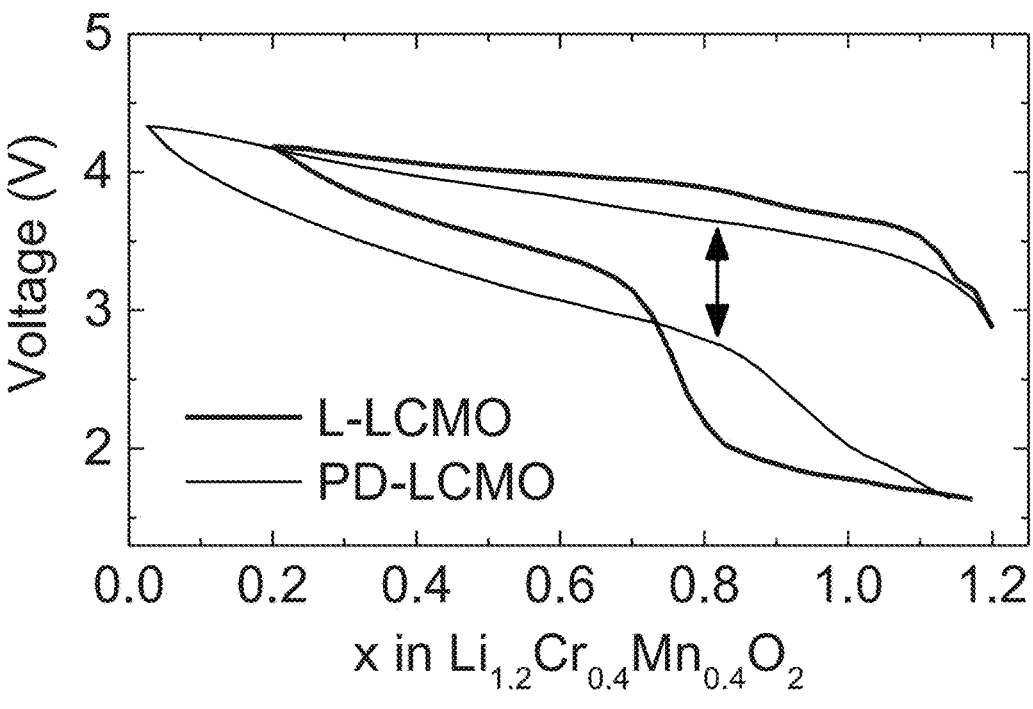
FIG. 7 is plot of voltage profiles of L-LCMO and PD-LCMO under galvanostatic intermittent titration technique (GITT) mode.
Figure 8:
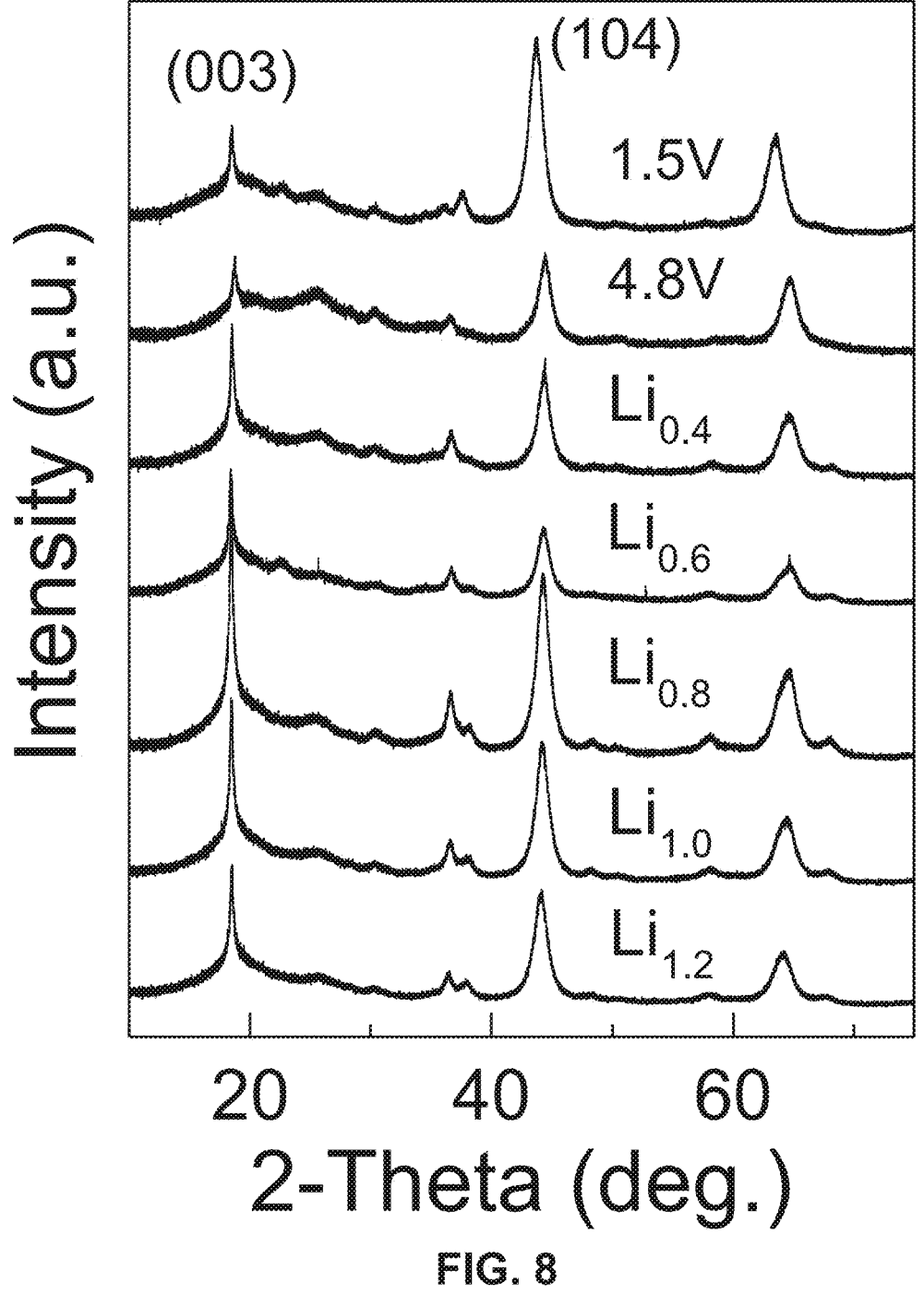
FIG. 8 is a plot of XRD patterns of pristine PD-LCMO, charged PD-LCMO at 4.8 V, discharged PD-LCMO at 1.5 V, and pristine disordered LCMO samples.
Figure 9:
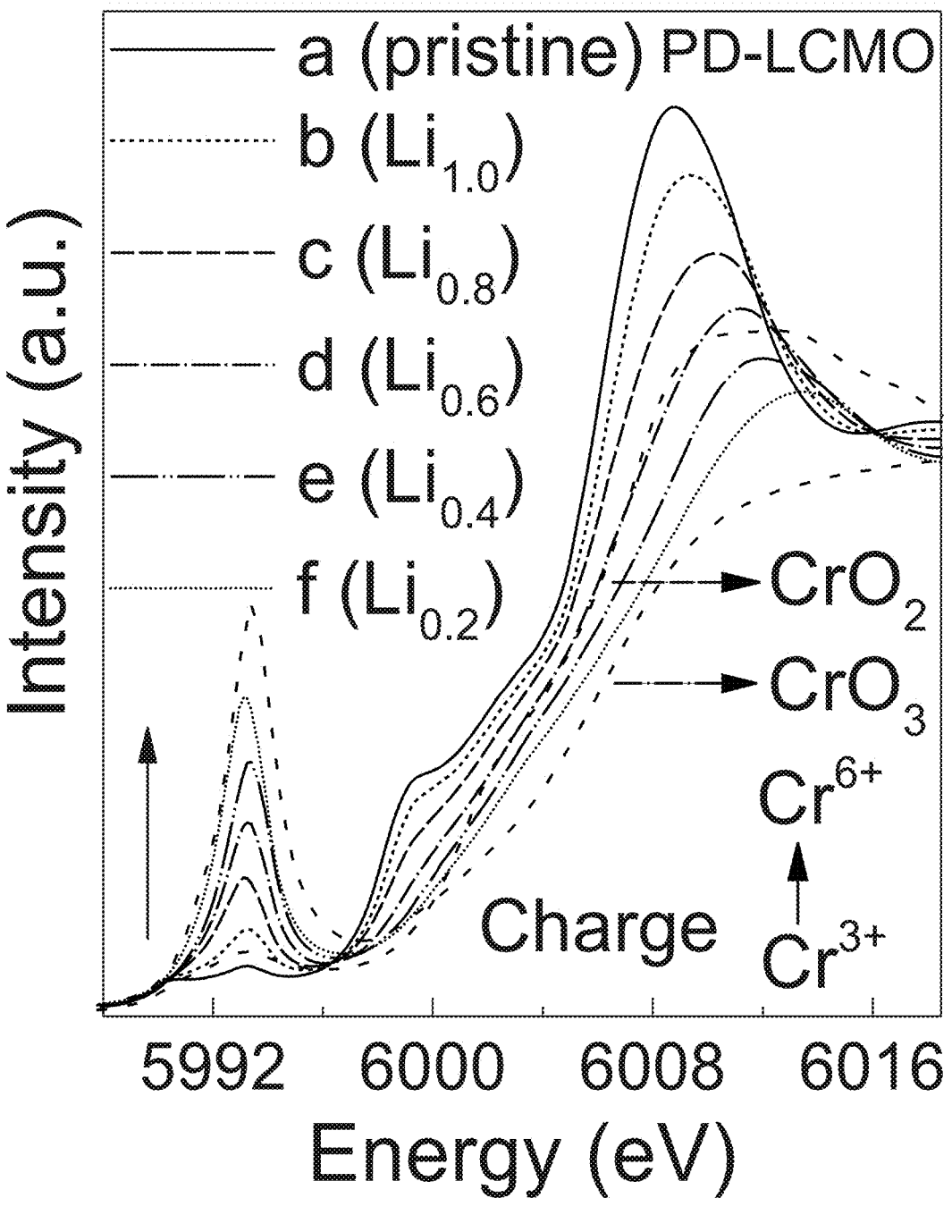
FIG. 9 is a plot of Cr K-edge X-ray absorption near edge structure (XANES) of PD-LCMO upon de-lithiation. The spectra of $CrO_2$ standard and $CrO_3$ standard are plotted as dashed lines.
Figure 10:
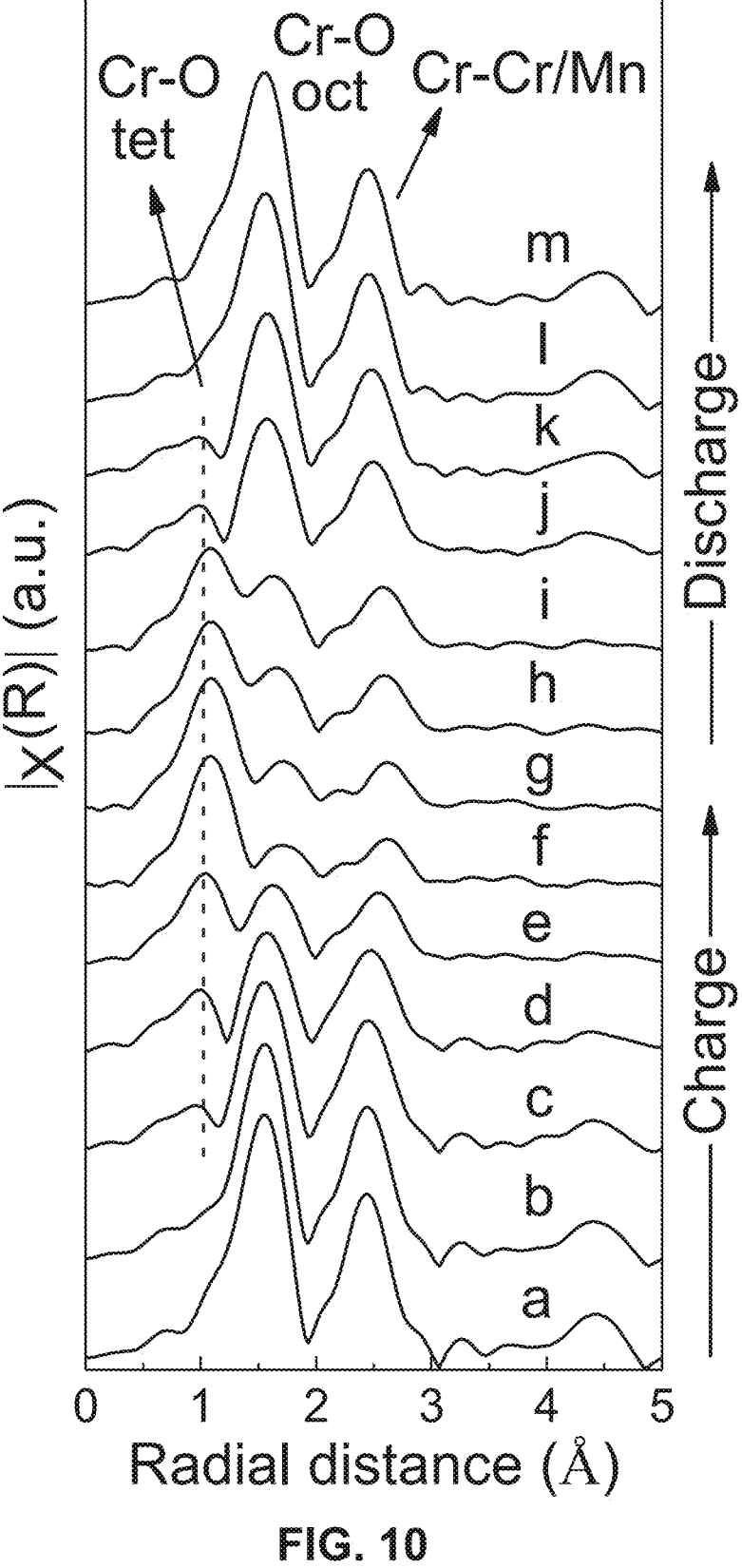
FIG. 10 is a plot of Cr K-edge extended X-ray absorption fine structure (EXAFS) of PD-LCMO upon de-lithiation and lithiation. The peaks at ~1.0, ~1.5, and ~2.5 Å correspond to the tetrahedral Cr—O (Cr—$O_{tet}$), octahedral Cr—O (Cr—$O_{oct}$), and Cr—Cr/Mn coordinations, respectively.

The voltage hysteresis and polarization of L-LCMO and PD-LCMO were also analyzed using galvanostatic intermittent titration (GITT) as shown in FIG. 7. While both L-LCMO and PD-LCMO exhibit voltage hysteresis in the quasi-equilibrium voltage curves, this hysteresis is twice as large for L-LCMO at composition $Li_{0.8}Cr_{0.4}Mn_{0.4}O_2$. The presence of the voltage hysteresis in the quasi-equilibrium voltage curves suggests it is created by a quasi-thermodynamic effect, rather than by basic $Li^+$ or $e^-$ transport limitations. In addition, reduced polarization can be observed in PD-LCMO during the discharge process.

First-cycle voltage profiles and capacity retention of L-LCMO and PD-LCMO at 20 mA $g^{-1}$ in the voltage window of 4.6-2.0 V were also evaluated. The reduced voltage hysteresis and polarization in PD-LCMO contribute to the high reversible capacity above 2.0 V. PD-LCMO delivers a discharge capacity of 303 mAh $g^{-1}$ (987 Wh $kg^{-1}$) in the voltage window of 4.6-2.0 V, which is comparable or higher than that of current promising high-energy cathode materials under similar test conditions, i.e., disordered $Li_2MnO_2F$ (283 mAh $g^{-1}$, 960 Wh $kg^{-1}$), layered $Li_{1.2}Ni_{0.13}Mn_{0.54}Co_{0.13}O_2$ (~270 mAh $g^{-1}$, ~950 Wh $kg^{-1}$), and disordered $Li_2Mn_{0.5}Ti_{0.5}O_2F$ (237 mAh $g^{-1}$, 767 Wh $kg^{-1}$).

In contrast, L-LCMO material only delivered a discharge capacity of 147 mAh $g^{-1}$ in the voltage window of 4.6-2.0 V. The PD-LCMO showed a superior rate capability between 4.4 and 2.0 V with a delivered capacity of 222 mAh $g^{-1}$ at 500 mA $g^{-1}$, higher than current promising Li-rich cathode materials in the art. To determine long-term cycling stability, PD-LCMO was cycled in the voltage window of 4.4-2.0 V using a concentrated electrolyte (LIFSI:DMC in a molar ratio of 1:1.1). The tests were performed under constant-current constant-voltage charging mode by charging the cell at 20 mA $g^{-1}$ to 4.4 V and holding at 4.4 V for 1 hour.

The capacity retention of PD-LCMO at different current densities was also evaluated. Rate capability test was performed at 20, 50, 100, 200, and 500 mA $g^{-1}$ for 3 cycles, respectively (cycle 1-15), and the long cycle stability test was performed at 100 mA $g^{-1}$ (cycle 16-120) in the voltage window of 4.4-2.0 V. PD-LCMO was shown to maintain a reversible capacity >240 mAh $g^{-1}$ at 20 mA $g^{-1}$ for 30 cycles, exhibiting higher cycling stability than that in the 1M $LiPF_6$ electrolyte, which can be attributed to reduced TM dissolution. PD-LCMO shows reasonable rate capability with a capacity of 128 mAh $g^{-1}$ at 500 mA $g^{-1}$ though the high viscosity of the concentrated electrolyte likely limits Li kinetics. After the rate test, PD-LCMO was cycled at 100 mA $g^{-1}$ from cycle 16 to cycle 120. The discharge capacity slightly decreases from 232 to 208 mAh $g^{-1}$ with <0.1% fade per cycle, and the average discharge voltage shows minor fade (0.05 V) from cycle 16 to cycle 120.

Example 3

To demonstrate the generalizability of the voltage hysteresis mitigation strategy, layered and partially disordered $Li_{1.05}V_{0.85}Ti_{0.1}O_2$ (L-LVTO and PD-LVTO) were prepared and compared with the L-LCMO and PD-LCMO materials. Layered $Li_{1.05}V_{0.85}Ti_{0.1}O_2$ (L-LVTO) was synthesized through a solid-state method. $Li_2CO_3$, $V_2O_3$, and $TiO_2$ were used as precursors, and 5% excess $Li_2CO_3$ was used to compensate for Li loss during synthesis. The ball-milled mixture was pelletized and then heated at 800° C. for 5 h under 2% $H_2$/Ar atmosphere. Partially disordered $Li_{1.05}V_{0.85}Ti_{0.1}O_2$ (PD-LVTO) was prepared using the 1h-ball-milling procedure as described in Example 1.

The XRD refinement results confirmed a layered structure with the R-3m space group in L-LVTO. After the introduction of partial cation disordering, the c lattice parameter in PD-LVTO decreased from 14.618 to 14.477 Å, and ~30% cation disordering was shown to be present in PD-LVTO. (See Table 2).

The voltage profiles of L-LVTO and PD-LVTO at 20 mA $g^{-1}$ in the voltage window of 4.3-1.3 V were also compared. Although the first-cycle charge capacity (240 mAh $g^{-1}$) is large in L-LVTO, corresponding to 0.78 Li removal per formula unit, the discharge capacity was only 104 mAh $g^{-1}$, and approximately 57% Li was not reversibly inserted. The irreversible Li loss can be due to irreversible V redox in L-LVTO, consistent with what was observed in layered $Li_{1.2}Cr_{0.4}Mn_{0.4}O_2$. In contrast, PD-LVTO shows a first-cycle charge and discharge capacity of 313 and 275 mAh $g^{-1}$, respectively, which benefits from the reduced voltage hysteresis consistent with the electrochemistry results in PD-LCMO.

The L-LVTO showed a large charge capacity of 240 mAh $g^{-1}$ but delivers a limited discharge capacity of 104 mAh $g^{-1}$ between 4.3 and 1.3 V. In contrast, PD-LVTO delivers a reversible capacity of ~275 mAh $g^{-1}$, which likely benefits from reduced voltage hysteresis as observed in LCMO. The inhibition of the collective TM migration in disordered structures may foster a rethinking of other collective effects that limit the performance in ordered electrode materials. For example, while the Jahn-Teller active $Mn^{3+}$ is not desirable for cathode design as a collective Jahn-Teller distortion causes large anisotropic lattice change limiting structural reversibility, a random cation arrangement may reduce such a collective distortion effect.

Example 4

To further illustrated the functionality of the compositions and methods, the redox mechanism and structural changes of the PD-LMCO material were evaluated. The relative intensity of the (003) diffraction peak in PD-LCMO was observed to gradually reduce upon charging to 4.8 V, suggesting the loss of some layered-like order as shown in the synchrotron XRD patterns of PD-LCMO at different states of charge and discharge of FIG. 8. When PD-LCMO is charged from the pristine state to the 4.8V-charged state, the refined c-lattice parameter decreases from 14.35 to 14.22 Å, and the unit cell shows a small volume decrease of 2.4%. Some layered structure-relating peaks at 48°, 58°, and 68° disappear in the XRD patterns of the 4.8V-charged and 1.5V-discharged samples, which indicates that Cr migration has occurred in the structure.

Cr K-edge X-ray absorption near edge structure (XANES) spectroscopy was also used to analyze the Cr redox. The Cr edge energy was seen to gradually shift from 5998 to 6005 eV upon de-lithiation (from a to f), indicative of $Cr^{3+}$ oxidation. Notably, a prominent pre-edge at ~5993 eV appears after de-lithiation, which is attributed to the formation of tetrahedral $Cr^{6+}O_4$. To verify whether the pre-edge feature was a characteristic indication of tetrahedral $Cr^{6+}$, the XANES spectra of $LiCrO_2$, $CrO_2$, and $CrO_3$ standards were compared. An intense pre-edge peak was observed for $CrO_3$, which contains $Cr^{6+}O_4$, whereas a very weak pre-edge peak was observed for $CrO_2$. In tetrahedral $Cr^{6+}O_4$, Cr 3d and 4p orbitals have the same $t_2$ symmetry, and the same symmetry leads to 3d-4p mixing, which enables the 1s-3d transition. More importantly, $Cr^{6+}$ ($3d^0$) contains no electrons in the d orbitals, and the empty d orbitals increase the probability of the 1s-3d transition, which contributes to the high pre-edge intensity. Therefore, the presence of tetrahedral $Cr^{6+}$ can be verified if a prominent Cr pre-edge peak is observed.

De-lithiating the $Li_{1.2}Cr_{0.4}Mn_{0.4}O_2$ to the $Li_{0.8}Cr_{0.4}Mn_{0.4}O_2$ form was expected to lead to a nominal $Cr^{4+}$ state. But the pre-edge peak in the $Li_{0.8}Cr_{0.4}Mn_{0.4}O_2$ spectrum was more intense than in the $CrO_2$ spectrum indicating that some tetrahedral $Cr^{6+}$ was already present in $Li_{0.8}Cr_{0.4}Mn_{0.4}O_2$ (PD-LCMO). The pre-edge intensity ratio of $Li_{0.2}Cr_{0.4}Mn_{0.4}O_2$ and $CrO_3$, which can be utilized to determine the $Cr^{6+}$ content in $Li_xCr_{0.4}Mn_{0.4}O_2$, was 0.77 indicating that $Cr^{3+}$/$Cr^{6+}$ oxidation is the dominant oxidation process occurring in the de-lithiation. Upon discharge, the pre-edge intensity continues to decrease, and the XANES spectrum at 1.5 V is similar to the one in the pristine state. Mn reduction was not observed above 2.0 V but is only observed to occur upon discharge to 1.5 V.

The local structural changes in PD-LCMO upon de-lithiation/lithiation were also characterized using extended X-ray absorption fine structure (EXAFS) spectroscopy. The observed peaks at ~1.0, ~1.5, and ~2.5 Å correspond to the tetrahedral Cr—O ($Cr—O_{tet}$), octahedral Cr—O ($Cr—O_{oct}$), and Cr—Cr/Mn coordinations, respectively.

In the charge process, a new peak at ~1.0 Å appeared, which can be attributed to the short Cr—O bond ($Cr—O_{tet}$) in the tetrahedral site. The appearance of a tetrahedral Cr ($Cr_{tet}$) signature is consistent with the decreasing amplitude of the $Cr—O_{oct}$ peak, indicating that the Cr occupancy in the octahedral sites decreases.

In the discharge process, the amplitude of the $Cr—O_{tet}$ peak in the EXAFS spectra gradually fades, whereas that of the $Cr—O_{oct}$ peak increases. Notably, the EXAFS spectrum of the discharged PD-LCMO (1.5 V) is very similar to that of the pristine PD-LCMO, indicating recovery of the Cr coordination environment. The changes in the EXAFS spectra indicate that Cr migrates from an octahedral to a tetrahedral site upon charge and reversibly migrates back upon discharge.

The redox activity of Cr in L-LCMO and PD-LCMO was also analyzed using Cr K-edge XANES spectroscopy. The pre-edge region at ~5993 eV of charged $Li_{0.8}Cr_{0.4}Mn_{0.4}O_2$ is similar to that of the $CrO_2$ standard. The absence of the prominent pre-edge peak in the $Li_{0.8}Cr_{0.4}Mn_{0.4}O_2$ XANES spectrum indicates that very little of the tetrahedral $Cr^{6+}$ is present. The estimated $Cr^{6+}$ contents at various stages of charge and discharge were evaluated. In the charge process, 18% of Cr is oxidized to $Cr^{6+}$ at composition $Li_{0.8}Cr_{0.4}Mn_{0.4}O_2$, which is smaller than the 33% in PD-LCMO at the same composition. Note that there would be 67% $Cr^{3+}$ and 33% $Cr^{6+}$ in $Li_{0.8}Cr_{0.4}Mn_{0.4}O_2$ if all redox occurred by the three-electron $Cr^{3+}$/$Cr^{6+}$ oxidation. Therefore, it appears that in L-LCMO $Cr^{3+}$ is first oxidized to $Cr^{4+}$ and then to $Cr^{6+}$ upon charging. In the discharge process, the $Cr^{6+}$ content linearly decreases suggesting reduction of $Cr^{6+}$ to $Cr^{3+}$. The different $Cr^{6+}$ content at high lithium concentration ($x \geq 0.8$ in $Li_xCr_{0.4}Mn_{0.4}O_2$) in the charge and discharge process indicate hysteretic Cr redox in L-LCMO. The Cr K-edge EXAFS spectroscopy confirmed irreversible Cr—O bond evolution upon charging/discharging.

XRD patterns of L-LCMO at various stages of charge and discharge were also collected to analyze any bulk structural changes. It was observed that the (003) diffraction peaks of the L-LCMO samples indicate that the structure does not trace the same path in charge as in discharge. The c-lattice parameter increases from 14.34 to 14.43 Å upon initial charging ($x{\geq}0.8$ in $Li_xCr_{0.4}Mn_{0.4}O_2$) and then decreases to 14.26 Å after charging to 4.8 V. Upon discharge, the lattice c increases from 14.26 to 14.33 Å at $Li_{0.4}Cr_{0.4}Mn_{0.4}O_2$ and then remains at approximately 14.33 Å up to discharge to 1.5 V. The irreversible lattice parameter change in L-LCMO appears to be related to a process at high lithium concentration ($x{\geq}0.8$ in $Li_xCr_{0.4}Mn_{0.4}O_2$) and is consistent with the irreversible Cr—O bond distance change.

Example 5

The migration of Cr and tetrahedral dumbbell formation in the disordered and layered structures were also evaluated. The EXAFS spectra were fitted to obtain quantitative Cr coordination information. In the PD-LCMO material spectra, the $Cr_{tet}$ content was observed to linearly increase to $65({\pm}3)\%$ at the top of charge ($Li_{0.2}Cr_{0.4}Mn_{0.4}O_2$) and reversibly decrease to 0 upon discharging to 1.5 V. However, the tetrahedral Cr content in L-LCMO showed an irreversible change after one charge and discharge. For $x{>}0.8$ in $Li_xCr_{0.4}Mn_{0.4}O_2$, the amount of $Cr_{tet}$ in the charged state (0-13%) is consistently below that found in discharge (0-25%).

To further investigate the preference of Cr migration in layered and disordered structures, the DFT calculated site energy difference ($E_{Tet}-E_{Oct}$) for Cr was used to quantify the tendency of Cr migration in each structure. Transition metal migration to a tetrahedral site requires that the face-sharing octahedral sites of this tetrahedral site be empty, which can be satisfied if a Li tri-vacancy (Tri-Vac) forms in a $Li_3Cr$ tetrahedron.

Calculations for Cr migration and dumbbell formation were performed with the SCAN meta-GGA exchange-correlation functional because of its better performance at capturing the relative energy difference of de-lithiated states. After fitting the cluster expansion model, Monte Carlo sampling was applied to obtain representative structures at experimental synthesis conditions for further evaluation of the Cr defect energetics. By evaluating the energy difference before and after Cr migration into a $Li_3M$ site for all the Cr atoms, it was possible to obtain good statistics on the Cr site energetics in different local environments.

Starting from the tri-vacancy case, other surrounding Li atoms that are not in the $Li_3M$ tetrahedron but within the first-neighbor-cation coordination shell were removed stepwise to capture the evolution of the site energy difference as a function of local composition. As a result, four different local Li vacancy concentrations were considered, i.e., tri-vacancy, quad-vacancy, penta-vacancy, and hex-vacancy. At each local vacancy concentration, DFT calculations with SCAN functionals were performed to obtain accurate energetics of Cr at either the octahedral site ($E_{Oct}$) or $Li_3M$ tetrahedral site ($E_{Tet}$). The energy difference between the two configurations ($E_{Tet}-E_{Oct}$) was used to quantify the tendency of Cr migration as a negative value indicates that it is energetically favorable for the Cr to migrate to the $Li_3M$ tetrahedron site.

To calculate the energy change in the presence of $Cr_{tet}$—$Li_{tet}$ dumbbells in the layered and disordered LCMO, de-lithiated state ($Li_{0.1}Cr_{0.4}Mn_{0.4}O_2$) with all cations occupying octahedral sites was used as energy reference ($E_{oct}$), and the relative energies of forming $Cr_{tet}$—$Li_{tet}$ dumbbells were calculated as $E-E_{oct}$. For both layered and disordered structures, the energy differences were averaged among 10 sampled structures from cluster expansion Monte Carlo simulations. For each of the structures, Li and Cr positions were rearranged accordingly to reach 1, 2, 3, 4, and 5 $Cr_{tet}$—$Li_{tet}$ dumbbells, respectively.

The results indicate that the driving force for Cr moving to a tetrahedral site is generally higher in PD-LCMO than in the layered structure. This is consistent with the EXAFS results that indicate that $Cr_{tet}$ forms earlier during charging in PD-LCMO compared with L-LCMO.

Figure 11:
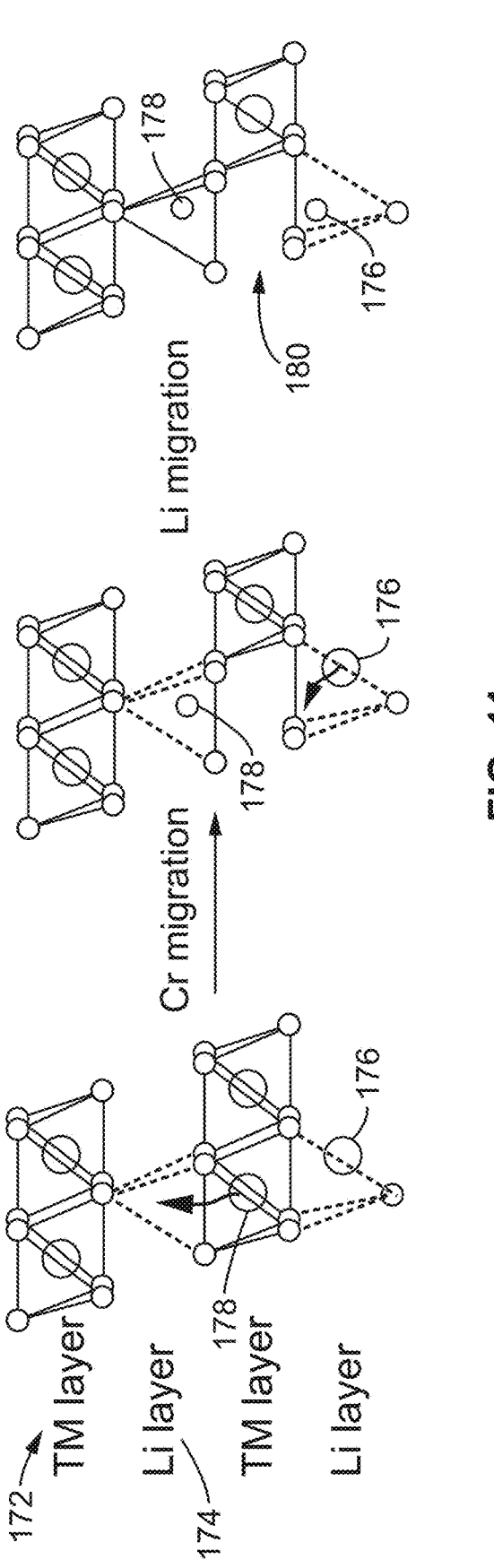
FIG. 11 is a schematic illustration of $Cr_{tet}$—$Li_{tet}$ dumbbell formation within the L-LCMO material.

The migration of Cr into the Li layer mechanism 170 is illustrated in a section of layered structure show in FIG. 11. In the layered version of the material, there are alternating transition metal layers 172 and lithium layers 174. Once the Cr atom 178 migrates from its position in the TM layer 172 to the upper tetrahedral site in the Li slab 174 layer of the layered structure, as shown by the arrow, the Li ion 176 that is immediately below the Cr vacancy can migrate to its face-sharing tetrahedral site (bottom tetrahedral site in FIG. 11 forming a $Cr_{tet}$—$Li_{tet}$ dumbbell 180. Such dumbbells 180 have been shown to lower the energy in Mn-based systems and have in general been shown to assist TM migration into a tetrahedral site.

Figure 12:
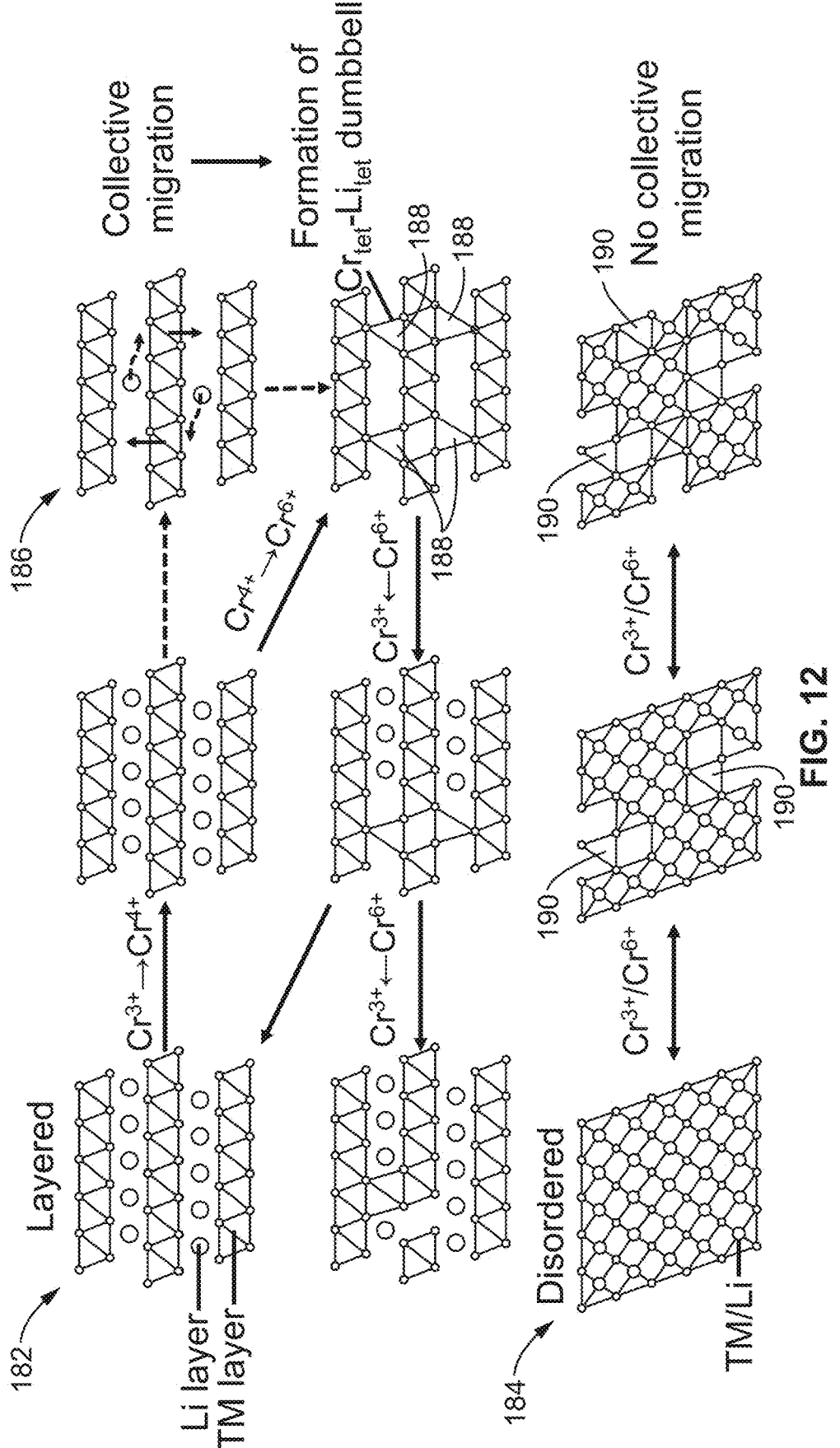
FIG. 12 is a schematic illustration of proposed Cr redox reaction mechanisms and migration pathways in layered and disordered $Li_{1.2}Cr_{0.4}Mn_{0.4}O_2$.

As shown in FIG. 11, the geometry of the layered structure will always orient the dumbbells perpendicular to the TM/Li layer. However, the orientation of the dumbbells 190 in the disordered structure will be random due to the absence of any specific TM/Li layering as seen in FIG. 12.

In addition, ab-initio calculations further support the relation between hysteresis and dumbbell formation. A change in energy is observed as more dumbbells are introduced in L- or PD-$Li_{0.1}Mn_{0.4}Cr_{0.4}O_2$. Not only does the formation of $Cr_{tet}$—$Li_{tet}$ dumbbells 188 lower the energy in L-LCMO more than in PD-LCMO, the energy continues to decrease in L-LCMO with the presence of more dumbbells, whereas PD-LCMO achieves an energy minimum after a certain concentration of dumbbells. This higher stability and favorable interaction of dumbbells in L-LCMO will lead to more collective, and therefore more hysteretic dumbbell creation than found in PD-LCMO. The preference of forming dumbbell complexes in L-LCMO is related to its layered structure which forces dumbbells to orient parallel to each other. Such alignment in L-LCMO creates an attractive interaction between Li-TM dumbbells, making them appear and disappear in a more collective manner than the isolated dumbbell formation that will occur in PD-LCMO.

To provide direct evidence of how the dumbbell complex is related to the shape of the voltage curve, DFT calculations were performed on the voltage profiles of PD-LCMO, L-LCMO, and L-LCMO with dumbbell complexes at end of discharge. For PD-LCMO and L-LCMO calculations, direct structural enumeration was performed to sample 25 structures at each discharge state. In the calculations of L-LCMO (dumbbell), structures were sampled by randomly placing $Cr_{tet}$—$Li_{tet}$ dumbbells into the lattice with given Li content. At each discharge state, all possible $Cr_{tet}$—$Li_{tet}$ dumbbell configurations were enumerated while random sampling was performed to generate a specific amount of Li—Cr dumbbell concentration. The amount of $Cr_{tet}$—$Li_{tet}$ dumbbells is determined by the average charge states of Cr, i.e., equal to the amount of $Cr^{6+}$ assuming all oxidized Cr is $Cr^{6+}$.

At the end of discharge (i.e. 1.2 Li/f.u.), two $Cr_{tet}$—$Li_{tet}$ dumbbells per structure are still generated to simulate the experimentally observed $Cr_{tet}$ in L-LCMO. Dumbbell complexes were only generated for a Li content $>0.6$ as this is close to the composition where significant voltage drop starts to occur in the experimental voltage profile. The calculated voltage curves of PD-LCMO and L-LCMO without dumbbells also have similar shapes. However, L-LCMO (dumbbell) shows a significant voltage drop at the end of discharge clearly showing that the dumbbell complexes cause a voltage drop. These results strongly suggest that the significant voltage hysteresis in L-LCMO is correlated with the stabilization of the $Cr_{tet}$—$Li_{tet}$ dumbbell complexes in the ordered structure.

Example 6

Layered and disordered $Li_{1.2}Cr_{0.4}Mn_{0.4}O_2$ were used to illustrate the two different reaction pathways of the L-LCMO material 182 and PD-LCMO materials 184 as shown in FIG. 12. As shown in FIG. 2 and FIG. 12, the layered L-LCMO material has alternating transition metal and Li slab layers of Li atoms.

In the layered $Li_{1.2}Cr_{0.4}Mn_{0.4}O_2$ material 182, the $Cr^{3+}$ is initially oxidized to $Cr^{4+}$ and then to $Cr^{6+}$ upon charging. At the top of charge 186, the Cr atoms collectively migrate to the tetrahedral sites 188 in the Li layers, and the $Cr_{tet}$ induce the formation of $Cr_{tet}$—$Li_{tet}$ dumbbells which stabilize the layered structure as shown by the dashed lines. The lowered energy is lost in the form of heat causing voltage hysteresis.

As demonstrated by the XAS results, in L-LCMO the redox pathway ($Cr^{6+} \rightarrow Cr^{3+}$) in lithiation does not retrace the de-lithiation oxidation sequence ($Cr^{3+} \rightarrow Cr^{4+} \rightarrow Cr^{6+}$). In the discharge process, $Cr^{6+}$ is gradually reduced to $Cr^{3+}$ showing irreversible Cr migration upon charging and discharging. Upon de-lithiation of $Li_xCr_{0.4}Mn_{0.4}O_2$ ($x \geq 0.8$) $Cr^{4+}$ forms and remains in an octahedral site as $d^2$-$Cr^{4+}$ is not particularly mobile. However, the fully oxidized $Cr^{6+}$ at the top of charge easily migrates to the tetrahedral site as its d configuration provides no ligand field stabilization in the octahedral site. Upon lithiation $Cr^{6+}$ is reduced to $Cr^{3+}$ although some $Cr^{6+}$ remains for $x>0.8$ in $Li_xCr_{0.4}Mn_{0.4}O_2$, leading to hysteretic Cr migration.

In contrast, the XAS on PD-LCMO indicated reversible $Cr^{3+}/Cr^{6+}$ three-electron redox and non-hysteretic Cr migration upon charge and discharge as shown in the lower pathway 184 of FIG. 12. The preferential and reversible formation of tetrahedral $Cr^{6+}$ early on in the charge in PD-LCMO is facilitated by the good match between the tetrahedron height and the size of $Cr^{6+}$. If the tetrahedron height is too large for the short metal-oxygen bonds, the tetrahedral TM is destabilized. An example of this is the large tetrahedron height in layered $NaCrO_2$ which inhibits Cr migration up to a de-sodiated state of $Na_{0.4}CrO_2$. Based on the refined c-lattice parameter the average tetrahedron height in pristine L-LCMO and PD-LCMO is 2.39 Å, yet the actual tetrahedron height in the Li layer of L-LCMO should be larger than 2.39 Å because the Li slab distance in pristine L-LCMO is 2.63 Å.

Upon de-lithiation to $Li_{0.8}Cr_{0.4}Mn_{0.4}O_2$, the average tetrahedron height in L-LCMO increases to 2.41 Å, and the slab distance increases to 2.65 Å. These dimensional changes increase the energy for $Cr_{tet}$ in the Li layer, tipping the balance towards oxidation of Cr to $Cr^{4+}_{oct}$ as the first oxidation process in L-LCMO.

In contrast, the presence of disorder makes the tetrahedral coordination environment in PD-LCMO more isotropic, and significant lattice expansion is not observed upon de-lithiation, both of which lower the energy for Cr in the tetrahedral site at $Li_xCr_{0.4}Mn_{0.4}O_2$ ($x \geq 0.8$) making it a more favorable oxidation path than $Cr^{4+}_{oct}$. Thus, L-LCMO and PD-LCMO show different Cr migration behavior in the charging process. While this does not necessarily imply a difference in hysteresis between L-LCMO and PD-LCMO, the computational analysis shows a fundamental difference in the Cr migration energetics in L-LCMO and PD-LCMO. Compared to PD-LCMO, the energy decrease in L-LCMO is larger when $Cr_{tet}$—$Li_{tet}$ dumbbells form, and continues to decrease as more dumbbells form, indicating an attractive interaction between them. This reinforcing interaction by which more dumbbells lead to increased stabilization is caused by the coupling through the slab spacing. Specifically, as the $Cr^{6+}$ migrates it further reduces the slab spacing and the size of the tetrahedral site in the Li layer, making it more favorable for $Cr^{6+}$. It is this coupling between slab spacing and $Cr^{6+}$ migration that creates the collective effect. Upon discharge, the stabilized $Cr_{tet}$ of PD-LCMO inhibits the expansion of the c-lattice parameter and its migration back to the octahedral site in the TM layer, causing hysteresis in the voltage, as supported by the computed voltage curves. Because of the lack of well-defined order in disordered materials, the dumbbells are more randomly oriented, limiting the collective effect in PD-LCMO and making the voltage non-hysteretic.

The Cr-based material is an ideal system to investigate the impact of TM migration on voltage hysteresis because the fully oxidized $Cr^{6+}$ is highly mobile. The introduction of $Cr^{3+}/Cr^{6+}$ redox in layered NMC materials generally leads to low energy efficiency/large voltage hysteresis, while the $Cr^{3+}/Cr^{6+}$ three-electron redox is reversibly utilized in a more disordered structure. Other redox systems with mobile cations (i.e., $Mo^{3+}/Mo^{6+}$ and $V^{3+}/V^{5+}$) also show high electrochemical performance in disordered structures, further supporting that (partially) disordered structures can accommodate a high degree of TM migration, by reducing their ability to make the motion collectively.

Accordingly, it has been demonstrated that the introduction of cation disorder inhibits the collective Cr migration in $Li_{1.2}Cr_{0.4}Mn_{0.4}O_2$, for example, and reduces the internal energy dissipation and voltage hysteresis associated with Cr migration. As a consequence of the more reversible Cr migration in the disordered structure, the cation-disordered $Li_{1.2}Cr_{0.4}Mn_{0.4}O_2$ shows significantly improved electrochemistry with high energy density and good cycling stability relative to layered $Li_{1.2}Cr_{0.4}Mn_{0.4}O_2$. The inhibition of the collective effects upon cation-disordering provides a new opportunity to design high-performance cathode materials.

From the description herein, it will be appreciated that the present disclosure encompasses multiple embodiments which include, but are not limited to, the following:

An electrode material comprising: (a) partially cation disordered $Li_{1+x}Cr_{1-x-y}M_yO_2$ where M is a transition metal selected from the group of $Mn^{4+}$, $Ti^{4+}$, $Zr^{4+}$, $Sn^{4+}$, $Nb^{5+}$, $Ta^{5+}$, or $W^{6+}$, where $0<x<0.33$ and $0<y<0.67$; (b) wherein transition metal migration to a lithium layer is reduced or inhibited during electrochemical cycling.

The material of any preceding or following implementation, wherein partial cation disorder is introduced through shear stress induced by mechanical milling of a layered $Li_{1+x}Cr_{1-x-y}M_yO_2$ material.

The material of any preceding or following implementation, wherein partial cation disorder comprises a percentage of the $Li_{1+x}Cr_{1-x-y}M_yO_2$ disordered within the range of about 10% to about 35% disorder.

The material of any preceding or following implementation, wherein partial disorder comprises a percentage of the $Li_{1+x}Cr_{1-x-y}M_yO_2$ that is greater than about 18% disordered.

The material of any preceding or following implementation, comprising partially disordered $Li_{1.2}Cr_{0.4}Mn_{0.4}O_2$, wherein lithium transport in the partially cation-disordered $Li_{1.2}Cr_{0.4}Mn_{0.4}O_2$ occurs through a percolation network of Li-rich tetrahedral environments.

The material of any preceding or following implementation, comprising partially disordered $Li_{1.05}V_{0.85}$ $Ti_{0.1}O_2$ (PD-LVTO) that exhibits mitigated voltage hysteresis and increased reversibility of $V^{3+}/V^{6+}$ redox relative to layered $Li_{1.05}V_{0.85}Ti_{0.1}O_2$ (L-LVTO).

The material of any preceding or following implementation, further comprising: a carbon derivative; and a binder; wherein the partially cation disordered $Li_{1+x}Cr_{1-x-y}M_yO_2$, the carbon derivative, and the binder are intermixed to form a composite electrode.

The material of any preceding or following implementation, wherein the binder is selected from the group consisting of polytetrafluoroethylene (PTFE), polyacrylic acid (PAA) and polyvinylidene fluoride (PVDF).

The material of any preceding or following implementation, wherein the carbon derivative is selected from the group consisting of carbon black, a plurality of carbon fibers, and carbon black and a plurality of carbon fibers.

A method for fabricating a lithium rich cathode active material, the method comprising: (a) providing a layered $Li_{1+x}Cr_{1-x-y}M_yO_2$ where M is a transition metal with limited redox activity, such as $Mn^{4+}$, $Ti^{4+}$, $Zr^{4+}$, $Sn^{4+}$, $Nb^{5+}$, $Ta^{5+}$, and $W^{6+}$, and where $0<x<0.33$ and $0<y<0.67$ composition; and (b) introducing cation disorder into the layered $Li_{1+x}Cr_{1-x-y}M_yO_2$ material to produce a partially or fully cation disordered $Li_{1+x}Cr_{1-x-y}M_yO_2$ material; (c) wherein cation disorder effectively mitigates voltage hysteresis and increases the reversibility of the $Cr^{3+}/Cr^{6+}$ redox couple from that exhibited by the layered $Li_{1+x}Cr_{1-x-y}M_yO_2$ material.

The method of any preceding or following implementation, wherein partial cation disorder is introduced through shear stress induced by mechanical milling of the layered $Li_{1+x}Cr_{1-x-y}M_yO_2$ material.

The method of any preceding or following implementation, further comprising: controlling time of mechanical milling of layered $Li_{1+x}Cr_{1-x-y}M_yO_2$ material to produce a percentage of partial cation disorder.

The method of any preceding or following implementation, wherein a time of mechanical milling of layered $Li_{1+x}Cr_{1-x-y}M_yO_2$ material to induce disorder comprises about 1 hour to about 20 hours.

The method of any preceding or following implementation, wherein partial disorder comprises a percentage of the $Li_{1+x}Cr_{1-x-y}M_yO_2$ within the range of about 10% to about 35% disorder.

The method of any preceding or following implementation, wherein partial disorder comprises a percentage of the $Li_{1+x}Cr_{1-x-y}M_yO_2$ that is greater than about 18% disordered.

The method of any preceding or following implementation, further comprising: providing a carbon derivative; providing a binder; mixing the partially cation disordered $Li_{1+x}Cr_{1-x-y}M_yO_2$ material, the carbon derivative, and the binder to form a composite.

A composite electrode, comprising: (a) a fully or partially cation disordered $Li_{1+x}Cr_{1-x-y}M_yO_2$ where M is a transition metal selected from the group of $Mn^{4+}$, $Ti^{4+}$, $Zr^{4+}$, $Sn^{4+}$, $Nb^{5+}$, $Ta^{5+}$, or $W^{6+}$, where $0<x<0.33$ and $0<y<0.67$ active material; (b) at least one carbon derivative; and (c) at least one binder; (d) wherein the fully or partially cation disordered $Li_{1+x}Cr_{1-x-y}M_yO_2$ active material, the carbon derivative, and the binder are intermixed to form a composite electrode.

The electrode of any preceding or following implementation, wherein partial cation disorder comprises a percentage of the $Li_{1+x}Cr_{1-x-y}M_yO_2$ that is greater than about 18% disordered.

The electrode of any preceding or following implementation, wherein the binder is selected from the group consisting of polytetrafluoroethylene (PTFE), polyacrylic acid (PAA) and polyvinylidene fluoride (PVDF).

The electrode of any preceding or following implementation, wherein the carbon derivative is selected from the group consisting of carbon black, a plurality of carbon fibers, and carbon black and a plurality of carbon fibers.

A method for fabricating a lithium rich cathode active material, the method comprising: (a) providing a layered $Li_{1+x}V_{1-x-y}M_yO_2$ or $Li_{1+x}Mo_{1-x-y}M_yO_2$ where M is a transition metal with limited redox activity, such as $Ti^{4+}$, $Zr^{4+}$, $Sn^{4+}$, $Nb^{5+}$, $Ta^{5+}$, and $W^{6+}$, and where $0<x<0.33$ and $0<y<0.67$ composition; and (b) introducing cation disorder into the layered $Li_{1+x}V_{1-x-y}M_yO_2$ or $Li_{1+x}Mo_{1-x-y}M_yO_2$ material to produce a partially or fully cation disordered $Li_{1+x}V_{1-x-y}M_yO_2$ or $Li_{1+x}Mo_{1-x-y}M_yO_2$ material; (c) wherein cation disorder effectively mitigates voltage hysteresis and increases the reversibility of the $V^{3+}/V^{6+}$ or $Mo^{3+}/Mo^{6+}$ redox couple from that exhibited by the layered $Li_{1+x}V_{1-x-y}M_yO_2$ or $Li_{1+x}Mo_{1-x-y}M_yO_2$ material.

The method of any preceding or following implementation, wherein partial cation disorder is introduced through shear stress induced by mechanical milling of the layered $Li_{1+x}V_{1-x-y}M_yO_2$ or $Li_{1+x}Mo_{1-x-y}M_yO_2$ material.

The method of any preceding or following implementation, further comprising: controlling time of mechanical milling of layered $Li_{1+x}V_{1-x-y}M_yO_2$ or $Li_{1+x}Mo_{1-x-y}M_yO_2$ material to produce a percentage of partial cation disorder.

The method of any preceding or following implementation, wherein a time of mechanical milling of layered $Li_{1+x}V_{1-x-y}M_yO_2$ or $Li_{1+x}Mo_{1-x-y}M_yO_2$ material to induce disorder comprises about 1 hour to about 20 hours.

The method of any preceding or following implementation, wherein partial disorder comprises a percentage of the $Li_{1+x}V_{1-x-y}M_yO_2$ or $Li_{1+x}Mo_{1-x-y}M_yO_2$ within the range of about 10% to about 35% disorder.

The method of any preceding or following implementation, wherein partial disorder comprises a percentage of the $Li_{1+x}V_{1-x-y}M_yO_2$ or $Li_{1+x}Mo_{1-x-y}M_yO_2$ that is greater than about 18% disordered.

The method of any preceding or following implementation, further comprising: providing a carbon derivative; providing a binder; mixing the partially cation disordered $Li_{1+x}V_{1-x-y}M_yO_2$ or $Li_{1+x}Mo_{1-x-y}M_yO_2$ material, the carbon derivative, and the binder to form a composite.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C," within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment," "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Rietveld Refinement of L-LCMO and PD-LCMO | | | | | | |
|---|---|---|---|---|---|---|
| Atom | Site | x | y | z | Occupancy | $B_{iso}$ |
| Sample: Layered $Li_{1.2}Cr_{0.4}Mn_{0.4}O_2$ (L-LCMO) Space group: R-3m. $R_{wp}$ = 8.27% a = 2.886354(5) Å, c = 14.35957(4) Å, V = 103.6028(5) Å³ | | | | | | |
| Li1 | 3a | 0 | 0 | 0 | 0.220(1) | 1.03(5) |
| Cr/Mn | 3a | 0 | 0 | 0 | 0.780(1) | 0.157(6) |
| O | 6c | 0 | 0 | 0.24167(3) | 1 | 0.92(2) |
| Li2 | 3b | 0 | 0 | 0.5 | 1.025(5) | 1.03(5) |

TABLE 1-continued

Rietveld Refinement of L-LCMO and PD-LCMO

| Atom | Site | x | y | z | Occupancy | $B_{iso}$ |
|------|------|---|---|---|-----------|-----------|

Sample: Partially disordered $Li_{1.2}Cr_{0.4}Mn_{0.4}O_2$ (PD-LCMO)
Space group: R-3m. $R_{wp}$ = 6.83%
a = 2.8869(1) Å, c = 14.340(1) Å, V = 103.50(1) Å³

| Atom | Site | x | y | z | Occupancy | $B_{iso}$ |
|------|------|---|---|---|-----------|-----------|
| Li1 | 3a | 0 | 0 | 0 | 0.347(8) | 1.75(6) |
| Cr1 | 3a | 0 | 0 | 0 | 0.338(6) | 0.19(1) |
| Mn1 | 3a | 0 | 0 | 0 | 0.315(6) | 0.19(1) |
| O | 6c | 0 | 0 | 0.24342(5) | 1 | 0.68(1) |
| Li2 | 3b | 0 | 0 | 0.5 | 0.853(8) | 1.75(6) |
| Cr2 | 3b | 0 | 0 | 0.5 | 0.062(6) | 0.19(1) |
| Mn2 | 3b | 0 | 0 | 0.5 | 0.085(6) | 0.19(1) |

TABLE 2

Rietveld Refinement of L-LVTO and PD-LVTO

| Atom | Site | x | y | z | Occupancy | $B_{iso}$ |
|------|------|---|---|---|-----------|-----------|

Sample: Layered $Li_{1.05}V_{0.85}Ti_{0.1}O_2$ (L-LVTO)
Space group: R-3m. $R_{wp}$ = 9.66%
a = 2.8769(2) Å, c = 14.61793(7) Å, V = 104.774(1) Å³

| Atom | Site | x | y | z | Occupancy | $B_{iso}$ |
|------|------|---|---|---|-----------|-----------|
| Li1 | 3a | 0 | 0 | 0 | 0.05 | 0.79 |
| V/Ti | 3a | 0 | 0 | 0 | 0.95 | 1.382(8) |
| O | 6c | 0 | 0 | 0.24167(3) | 1 | 0.55(2) |
| Li2 | 3b | 0 | 0 | 0.5 | 1 | 0.79 |

Sample: Partially disordered $Li_{1.05}V_{0.85}Ti_{0.1}O_2$ (PD-LVTO)
Space group: R-3m. $R_{wp}$ = 7.28%
a = 2.8995(3) Å, c = 14.477(1) Å, V = 103.401(9) Å³

| Atom | Site | x | y | z | Occupancy | $B_{iso}$ |
|------|------|---|---|---|-----------|-----------|
| Li1 | 3a | 0 | 0 | 0 | 0.33 | 0.79 |
| V1/Ti1 | 3a | 0 | 0 | 0 | 0.667(1) | 0.79 |
| O | 6c | 0 | 0 | 0.2438(1) | 1 | 0.79 |
| Li2 | 3b | 0 | 0 | 0.5 | 0.72 | 0.79 |
| V2/Ti2 | 3b | 0 | 0 | 0.5 | 0.283(1) | 0.79 |

What is claimed is:

1. An electrode material comprising:

(a) partially cation disordered $Li_{1+x}Cr_{1-x-y}M_yO_2$ where M is a transition metal selected from the group of $Mn^{4+}$, $Ti^{4+}$, $Zr^{4+}$, $Sn^{4+}$, $Nb^{5+}$, $Ta^{5+}$, or $W^{6+}$, where $0<x<0.33$ and $0<y<0.67$;

(b) wherein transition metal migration to a lithium layer is reduced or inhibited during electrochemical cycling.

2. The material of claim 1, wherein partial cation disorder comprises a percentage of the $Li_{1+x}Cr_{1-x-y}M_yO_2$ disordered within the range of about 10% to about 35% disorder.

3. The material of claim 1, wherein partial disorder comprises a percentage of the $Li_{1+x}Cr_{1-x-y}M_yO_2$ that is greater than about 18% disordered.

4. The material of claim 1, comprising partially disordered $Li_{1.2}Cr_{0.4}Mn_{0.4}O_2$, wherein lithium transport in the partially cation-disordered $Li_{1.2}Cr_{0.4}Mn_{0.4}O_2$ occurs through a percolation network of Li-rich tetrahedral environments.

5. The material of claim 1, further comprising:

a carbon derivative; and a binder;

wherein said partially cation disordered $Li_{1+x}Cr_{1-x-y}M_yO_2$, said carbon derivative, and said binder are intermixed to form a composite electrode.

6. The material of claim 5, wherein the binder is selected from the group consisting of polytetrafluoroethylene (PTFE), polyacrylic acid (PAA) and polyvinylidene fluoride (PVDF).

7. The material of claim 5, wherein the carbon derivative is selected from the group consisting of carbon black, a plurality of carbon fibers, and carbon black and a plurality of carbon fibers.

* * * * *